(12) United States Patent
Zhang et al.

(10) Patent No.: US 12,101,803 B2
(45) Date of Patent: Sep. 24, 2024

(54) SIDELINK QUALITY OF SERVICE MANAGEMENT IN AUTONOMOUS MODE OF WIRELESS COMMUNICATIONS SYSTEMS AND RELATED METHODS AND APPARATUSES

(71) Applicant: Telefonaktiebolaget LM Ericsson (publ), Stockholm (SE)

(72) Inventors: Congchi Zhang, Shanghai (CN); Shehzad Ali Ashraf, Aachen (DE); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 437 days.

(21) Appl. No.: 17/280,119

(22) PCT Filed: Sep. 10, 2019

(86) PCT No.: PCT/EP2019/074114
§ 371 (c)(1),
(2) Date: Mar. 25, 2021

(87) PCT Pub. No.: WO2020/064325
PCT Pub. Date: Apr. 2, 2020

(65) Prior Publication Data
US 2021/0345363 A1 Nov. 4, 2021

Related U.S. Application Data

(60) Provisional application No. 62/737,299, filed on Sep. 27, 2018, provisional application No. 62/737,149, filed on Sep. 27, 2018.

(51) Int. Cl.
*H04W 72/566* (2023.01)
*H04W 28/02* (2009.01)
(Continued)

(52) U.S. Cl.
CPC ..... *H04W 72/569* (2023.01); *H04W 28/0268* (2013.01); *H04W 72/20* (2023.01); *H04W 72/543* (2023.01); *H04W 76/14* (2018.02)

(58) Field of Classification Search
CPC ........... H04W 72/569; H04W 28/0268; H04W 72/20; H04W 72/543; H04W 76/14; H04W 92/18
See application file for complete search history.

(56) References Cited

U.S. PATENT DOCUMENTS

2016/0150520 A1* 5/2016 Fodor .................. H04W 72/51
455/552.1
2016/0278069 A1 9/2016 Lee et al.
(Continued)

FOREIGN PATENT DOCUMENTS

CN 106797644 A 5/2017
EP 3273634 A1 1/2018
(Continued)

OTHER PUBLICATIONS

International Search Report and Written Opinion of the International Searching Authority for PCT International Application No. PCT/EP2019/074114 dated Dec. 11, 2019.
(Continued)

*Primary Examiner* — Huy D Vu
*Assistant Examiner* — Robert Ma
(74) *Attorney, Agent, or Firm* — Sage Patent Group

(57) ABSTRACT

A method is disclosed for operating a user equipment (UE) for device-to-device (D2D) communications. The method includes receiving booking information from another UE. The booking information identifying a resource that the other UE is booking to use for transmission by the other UE and further including priority information. The method further includes selectively transmitting preemption signaling based on whether the received priority information indicates lower priority than local priority information that is associated with a transmission to be scheduled by the UE.

(Continued)

The preemption signaling indicates preemption of the UE to use the resource identified by the booking information. The method further includes scheduling the UE to transmit using the resource identified by the booking information.

17 Claims, 16 Drawing Sheets

(51) Int. Cl.
    *H04W 72/20*     (2023.01)
    *H04W 72/543*     (2023.01)
    *H04W 76/14*     (2018.01)

(56) References Cited

U.S. PATENT DOCUMENTS

| | | | |
|---|---|---|---|
| 2017/0230939 A1* | 8/2017 | Rudolf | H04L 12/1863 |
| 2018/0234994 A1 | 8/2018 | Yasukawa et al. | |
| 2020/0288431 A1* | 9/2020 | Lee | H04W 56/0015 |

FOREIGN PATENT DOCUMENTS

| | | |
|---|---|---|
| WO | 2013163595 A2 | 10/2013 |
| WO | 2016022849 A1 | 2/2016 |
| WO | 2016024890 A1 | 2/2016 |
| WO | 2018064128 A1 | 4/2018 |
| WO | 2020030007 A1 | 2/2020 |
| WO | 2020030793 A1 | 2/2020 |

OTHER PUBLICATIONS

Intel Corporation, "Priority handling for UE autonomous resource selection," R2-153285, 3GPP TSG-RAN WG2 Meeting #90, Fukuoka, Japan; May 25-29, 2015, 5 pages.

Huawei et al., "Support of QoS for PC5-based V2X transport," R2-164917, 3GPP TSG-RAN WG2 Meeting #95, Gothenburg, Sweden; Aug. 22-26, 2016, 6 pages.

3GPP TR 22.886 V16.1.1, "3rd Generation Partnership Project; Technical Specification Group Services and System Aspects; Study on enhancement of 3GPP Support for 5G V2X Services (Release 16)," Technical Report, Sep. 2018, 74 pages.

3GPP TS 23.501 V15.3.0, "3rd Generation Partnership Project; Technical Specification Group Services and System Aspects; System Architecture for the 5G System; Stage 2 (Release 15)," Technical Specification, Sep. 2018, 226 pages.

Ericsson, "NR sidelink QoS handling," TDoc R1-18xxxxx, 3GPP TSG-RAN WG1 Meeting #94-Bis, Chengdu, China, Oct. 8-12, 2018, 3 pages.

Ericsson, "NR sidelink QoS handling," R1-1813652, 3GPP TSG-RAN WG1 Meeting #95, Spokane, USA, Nov. 12-16, 2018, 4 pages.

Ericsson, "NR Sidelink Access Stratum QoS handling," TDoc R2-18xxxxx, 3GPP TSG-RAN WG2 #103-Bis, Chengdu, China, Oct. 8-12, 2018, 3 pages.

Ericsson, "On Sidelink Discovery," TDoc R2-1817927, 3GPP TSG-RAN WG2 #104, Spokane, WA, USA, Nov. 12-16, 2018, 4 pages.

Ericsson, "NR V2X sidelink protocol stack overview," TDoc R2-1817961, 3GPP TSG-RAN WG2 #104, Spokane, WA, USA, Nov. 12-16, 2018, 4 pages.

Ericsson, "On NR sidelink admission control," TDoc R2-1817925, 3GPP TSG-RAN WG2 #104, Spokane, WA, USA, Nov. 12-16, 2018, 3 pages.

Ericsson, "On NR sidelink radio bearer," TDoc R2-1817926, 3GPP TSG-RAN WG2 #104, Spokane, WA, USA, Nov. 12-16, 2018, 3 pages.

Office Action dated Nov. 17, 2023 for Chinese Patent Application No. 201980077411.1, 7 pages.

"QoS Principles," 3GPP TSG RAN WG2 #104, TDoc R2-1817924, Spokane, WA, USA, Nov. 12-16, 2018, Agenda Item 11.4.5, Ericsson, 4 pages.

\* cited by examiner

SIDELINK QUALITY OF SERVICE MANAGEMENT IN AUTONOMOUS MODE OF WIRELESS COMMUNICATIONS SYSTEMS AND RELATED METHODS AND APPARATUSES

CROSS REFERENCE TO RELATED APPLICATIONS

This application is a 35 U.S.C. § 371 national stage application of PCT International Application No. PCT/EP2019/074114 filed on Sep. 10, 2019, which claims the benefit of U.S. Provisional Patent Application Ser. No. 62/737,149, filed on Sep. 27, 2018, and U.S. Provisional Patent Application Ser. No. 62/737,299, filed on Sep. 27, 2018, the disclosures and content of which are incorporated by reference herein in their entireties.

TECHNICAL FIELD

The present disclosure relates generally to communications, and more particularly, to wireless communications and related wireless devices and network nodes.

BACKGROUND

LTE vehicle-to-anything (V2X) was first specified in 3GPP Release 14 of 3GPP LTE and is currently under investigation for 3GPP Release 15. LTE V2X includes new features and enhancements that allow for vehicular communications. One of the most relevant aspects is the introduction of direct vehicle-to-vehicle (V2V) communication functionalities. The specifications support other type of V2X communications, including V2P (vehicle-to-pedestrian or pedestrian-to-vehicle), V2I (vehicle-to-infrastructure), etc., as shown in FIG. 1.

These direct communication functionalities are built upon LTE D2D (device to device), also known as ProSe (Proximity Services), as first specified in the Release 12 of LTE, and include many important enhancements targeting the specific characteristics of vehicular communications. For example, LTE V2X operation is possible with and without network coverage and with varying degrees of interaction between the UEs (user equipment) and the network (NW), including support for standalone, network-less operation. To enhance the system level performance under high device density while meeting the latency requirements of V2X, new transmission modes (also referred to as resource allocation modes) were introduced: Mode 3 and Mode 4. In Mode 3, the NW is in charge of performing resource allocation whereas in Mode 4, the UE autonomously selects the resources for its own transmissions.

To support 5G V2X services, 28 use cases and their performance requirements are studied in TR 22.886 [1]. It is shown that 5G V2X services usually come with stringent Quality of Service (QoS) requirements, e.g. 99.999% reliability and 10 ms latency. Benefiting from the ultra-reliable and lower latency wireless connection, vehicles can optimize their maneuvers via, e.g., cooperative driving or forming a platoon. From another perspective, any disturbance/interruption on the wireless connection may lead to hazardous situations or even car accident.

Different from the QoS control mechanism used in cellular network, QoS control in Sidelink (SL) communications is based on the concept of ProSe Per-Packet Priority (PPPP) and ProSe Per-Packet Reliability (PPPR). When the ProSe upper layer (i.e. above PC5 access stratum) passes a protocol data unit (PDU) for transmission to the PC5 access stratum, the ProSe upper layer provides a ProSe Per-Packet Priority from a range of 8 possible values. Each PPPP expresses a relative priority compared to other PPPPs, i.e. PPPP=1 has highest priority than PPPP=2, PPPP=3, etc. The PPPP values also indicate their relative latency requirements, i.e. PPPP=1 has more stringent packet delay budget (PDB) requirements than PPPP=2, PPPP=3, etc. Additionally, along with the PPPP, upper layers may also indicate the PPPR value of a given packet. Priority queues (both intra-UE and inter-UE) are expected to be served in priority order, i.e., UE serves all packets associated with ProSe Per-Packet Priority N before serving packets associated with priority N+1 (lower number meaning higher priority). Similarly, the PPPR is used to determine whether SL packet duplication to enhance transmission reliability shall be used or not.

When the network (NW) scheduled operation mode (also known as mode-3) is used, the following additional operations apply:
  The NW configures a mapping between Logic Channel Groups (LCGs) and PPPPs for the sake of sidelink buffer status report (SL-BSR) reporting.
  The UE indicates in SL-BSR the LCGs for which there are packets to transmit over the PC5 interface.
  When the eNB receives the SL-BSR can determine which are the PPPPs of the packets the UEs need to transmit over PC5, thereby also inferring the priority info and the packet delay budget.
  eNB can use the priority information reflecting PPPP for priority handling and UE-PC5-AMBR for capping the UE PC5 transmission in the resources management.
  For the case of PPPR, the eNB/gNB may reserve one or more LCGs for the PPPR reporting. So that the eNB upon receiving the SL-BSR can for example decide whether to enable packet duplicaton or not.

When the autonomous resources selection mode is used (mode-4), the following additional operations apply:
  PPPP is contained in Sidelink Control Information (SCI) to avoid other UEs transmitting on the high priority resources.
  The UE derives the packet delay budget of the V2X message from PPPP based on the provisioned mapping information described.

NR sidelink design is on-going in 3GPP. In terms of QoS framework, many advantages are foreseen if we let NR SL inherit the same QoS framework as in Uu based on e.g. Allocation and Retention Priority (ARP), 5QI etc. The possibility of inheriting the bearer based SL QoS control may be used when UEs are in coverage. Specifically, QoS properties are provided from upper layer to AS. Then it is mapped to the corresponding data radio bearer for transmission according to the bearer configuration method, i.e. bearer request based, attachment procedure based, and SIB signaling based. Admission control could also be applied to help NW reject SL bearer requests when the channel is full or preempt low priority bearers for high priority ones.

When SL UEs are in NW controlled mode, the QoS management operations include:
  At bearer level, admission control can be done by eNB/gNB with global knowledge and response explicitly with acceptance or rejection.
  At packet level, scheduling can be done by eNB/gNB based on certain algorithm considering the priority of each transmission request, e.g. indicated by the priority level in QCI/5QI.

Potential Problems with Previously Known Approaches

Potential problems that arise when these above approaches it that is it not certain how SL QoS management can be done in autonomous mode. The system components do not have defined operations for how admission control at the bearer level should be conducted. Moreover, the system components do not have defined operations for how different transmission priorities are to handled at the packet level, and how they are to avoid severe interference. For example, in LTE SL high priority transmissions are allowed to use the same resources for on-going low priority transmissions, which may cause severe interference.

SUMMARY

Some embodiments of the present disclosure are directed to a method of operating a user equipment (UE) for device-to-device (D2D) communications. The method includes receiving booking information from another UE. The booking information identifying a resource that the other UE is booking to use for transmission by the other UE and further including priority information. The method further includes selectively transmitting preemption signaling based on whether the received priority information indicates lower priority than local priority information that is associated with a transmission to be scheduled by the UE. The preemption signaling indicates preemption of the UE to use the resource identified by the booking information. The method further includes scheduling the UE to transmit using the resource identified by the booking information.

Some other related embodiments of the present disclosure are directed to a user equipment (UE) that is adapted to perform receiving of booking information from another UE, where the booking information identifies a resource that the other UE is booking to use for transmission by the other UE and further including priority information. The UE is further adapted to selectively transmit preemption signaling based on whether the received priority information indicates lower priority than local priority information that is associated with a transmission to be scheduled by the UE. The preemption signaling indicates preemption of the UE to use the resource identified by the booking information. The UE is further adapted to schedule the UE to transmit using the resource identified by the booking information.

Some other embodiments of the present disclosure are directed to a UE that includes a transceiver, a processor coupled to the transceiver, and a memory coupled with the processor. The memory stores instructions that when executed by the processor causes the UE to perform operations that include receiving booking information from another UE, where the booking information identifies a resource that the other UE is booking to use for transmission by the other UE and further including priority information. The operations further include selectively transmitting preemption signaling based on whether the received priority information indicates lower priority than local priority information that is associated with a transmission to be scheduled by the UE. The preemption signaling indicates preemption of the UE to use the resource identified by the booking information. The operations further include scheduling the UE to transmit using the resource identified by the booking information.

Some potential advantages that may be provided by these embodiments include that they enable sidelink (SL) admission control and packet preemption in autonomous mode. Each SL bearer can be associated with a bearer level priority indicator and a packet level priority indicator. When there are not enough resources available for SL bearer establishment or for packets transmission, one UE can preempt some booked lower priority transmissions; otherwise, the UE must release the corresponding bearer. These admission control and packet preemption operations can improve Quality of Service (QoS) management in SL autonomous mode, where decisions are made in a distributed manner. UEs are allowed to establish a bearer and activate a V2X service only when there are enough resources to support required QoS and will not disturb the services having higher priority.

Other methods, UEs, and computer program products according to embodiments of the inventive subject matter will be or become apparent to one with skill in the art upon review of the following drawings and detailed description. It is intended that all such additional methods, UEs, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
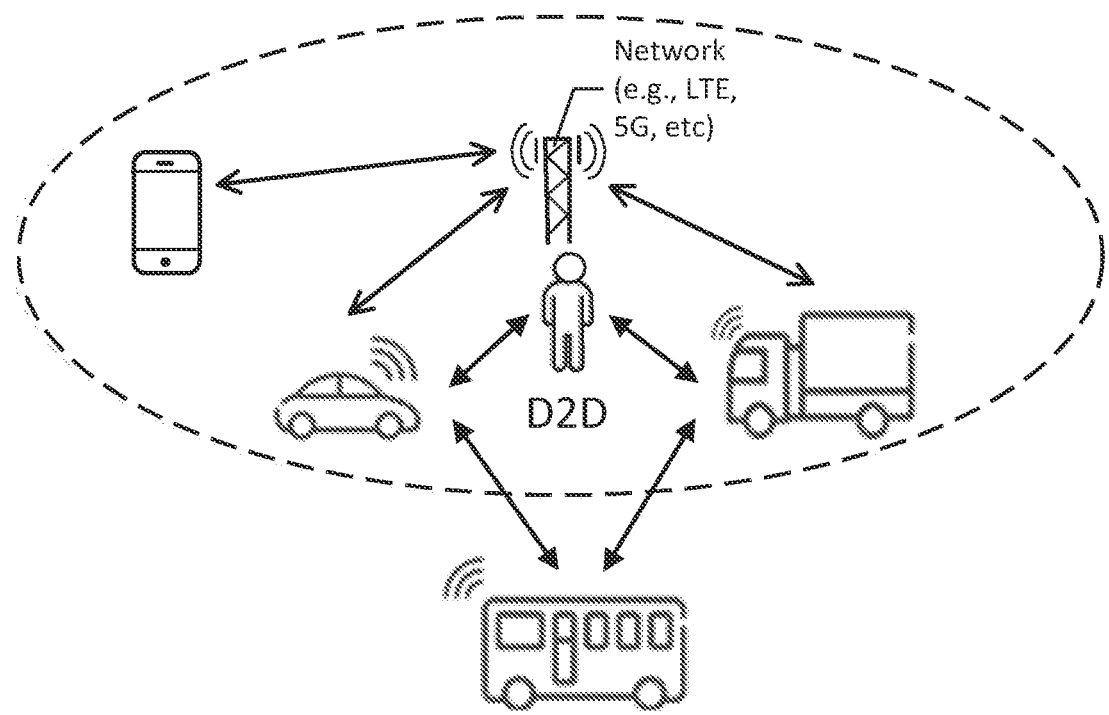
FIG. 1 illustrates an example V2X wireless communication network.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Overview of Present Approaches and Potential Advantages:

Systems, methods, and corresponding apparatuses are disclosed below that operate to enable SL admission control and packet preemption in autonomous mode. Each SL bearer is associated with a bearer level priority indicator and a packet level priority indicator. When there are not enough resources available for SL bearer establishment or for packets transmission, one UE can preempt some booked lower priority transmissions; otherwise, the UE must release the corresponding bearer.

These admission control and packet preemption operations can improve QoS management in SL autonomous mode, where decisions are made in a distributed manner. UEs are allowed to establish a bearer and activate a V2X service only when there are enough resources to support required QoS and will not disturb the services having higher priority.

Accordingly, various embodiments disclosed herein are directed to admission control and pre-emption operations for distributed sidelink framework. Although these embodiments are primarily described in terms of 3GPP technologies, they are not limited thereto and may be extended for use in any non-3GPP technology using the QoS framework.

Two levels of pre-emption, i.e., at bearer level and at packet level, are described for distributed mode of sidelink communication without any central controlling entity (such as BS). Bearer level admission control and pre-emption is maintained using bearer level priority and packet level scheduling and pre-emption is maintained using packet level priority indicator.

1. Priority Information for Each SL Bearer:

Two priority indicators are operationally associated with each SL bearer to enable bearer and packet level QoS management.

1) A bearer level priority, e.g., ARP or similar, is operationally associated with each SL bearer. The bearer level priority is used to indicate a priority difference for bearer establishment and release, e.g., when a channel is congested and the lowest priority bearer is responsively dropped.

2) A packet level priority, e.g. PPPP, LCID, or Priority Level (PL) indicated by 5QI or similar, is operationally associated with each SL bearer. The packet level priority is used to indicate a priority difference for scheduling, e.g., one UE will schedule the packet with highest packet level priority first, followed by a next highest packet level priority, etc.

In one embodiment, the mapping between V2X services and these two priority indicators (i.e., bearer level priority and packet level priority) can be preconfigured according to a UE's subscription or service level agreements. When operating within a NW coverage, the mapping can be overridden by network signaling, e.g., system information block (SIB) or radio resource control (RRC).

To assist the admission control and packet preemption, SL UEs can include these two indicators within the sidelink control information (SCI) during the packets transmission. The SCI can be carried over physical sidelink control channel (PSCCH) associated to data transmission or can be a dedicated small control signal such as pre-emption signal etc.

For further explanation below, the term ARP is used to refer to a bearer priority indicator and the term PL is used to refer to a packet priority indicator. For example, in one embodiment a high ARP value or a high PL value represents a low priority.

Figure 5:
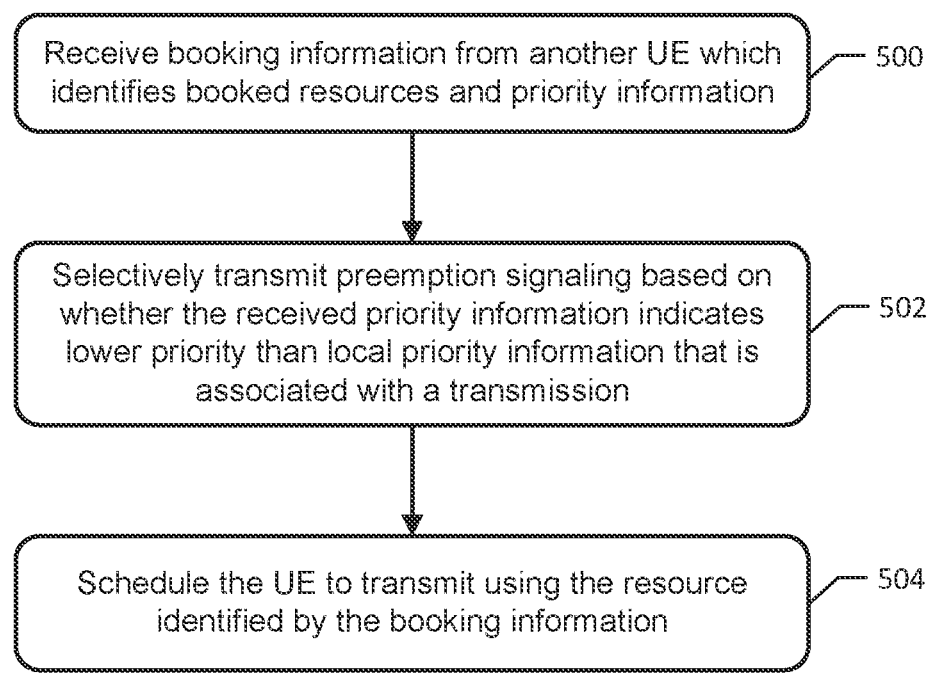
FIG. 5 is a flowchart of operations that can be performed by a UE to receive priority information that is used to control transmission of device-to-device (D2D) communications in accordance with some embodiments.

FIG. 5 is a flowchart of operations that can be performed by a UE to receive priority information that is used to control transmission of device-to-device (D2D) communications in accordance with some embodiments.

Referring to FIG. 5, the UE receives 500 booking information from another UE. The booking information identifies a resource that the other UE is booking to use for transmission by the other UE. The booking information also includes priority information. The UE then selectively transmits 502 preemption signaling based on whether the received priority information indicates lower priority than local priority information that is associated with a transmission to be scheduled by the UE. The preemption signaling indicates preemption of the UE to use the resource identified by the booking information. The UE is scheduled 504 to transmit using the resource identified by the booking information.

The priority information can include bearer level priorities for bearers (e.g., SL bearers) as content of the booking information. The operation to selectively transmit preemption signaling, can include selectively transmitting the preemption signaling based on comparison of the received bearer level priorities for the bearers to a local bearer level priority.

For each of the bearers, the UE can operate to control establishment and release of the bearer by the UE responsive to comparison of the received bearer level priority for the bearer to the local bearer level priority.

The priority information can include a packet level priority as content of the booking information. The operation to respond to schedule the UE to transmit using the resource identified by the booking information, can include scheduling a packet for transmission that is selected among a plurality of queued packets based on comparison of the received packet level priority to packet level priorities of the queued packets.

The local priority information can include a local bearer level priority indicator for a SL bearer and a local packet level priority indicator. The local bearer level priority and the local packet level priority are mapped to a service. The mapping can be received from a network node. In a further embodiment, the UE can receive the mapping in at least one system information block (SIB) or at least one radio resource control (RRC) block from the network node.

The received priority information can include a bearer level priority indicator for a SL bearer and a packet level priority indicator. The booking information may be received in sidelink control information (SCI) from the other UE.

The local priority information may include a bearer level priority indicator for a SL bearer and packet level priority indicator, which can be determined based on UE subscription information and/or based on a service level agreement for the UE.

Although various embodiments are described in the context of SL communications, is to be understood that any reference to SL herein may be replaced with a reference to D2D in order to reflect the possible breath of applicability of all of the embodiments disclosed herein.

Figure 2:
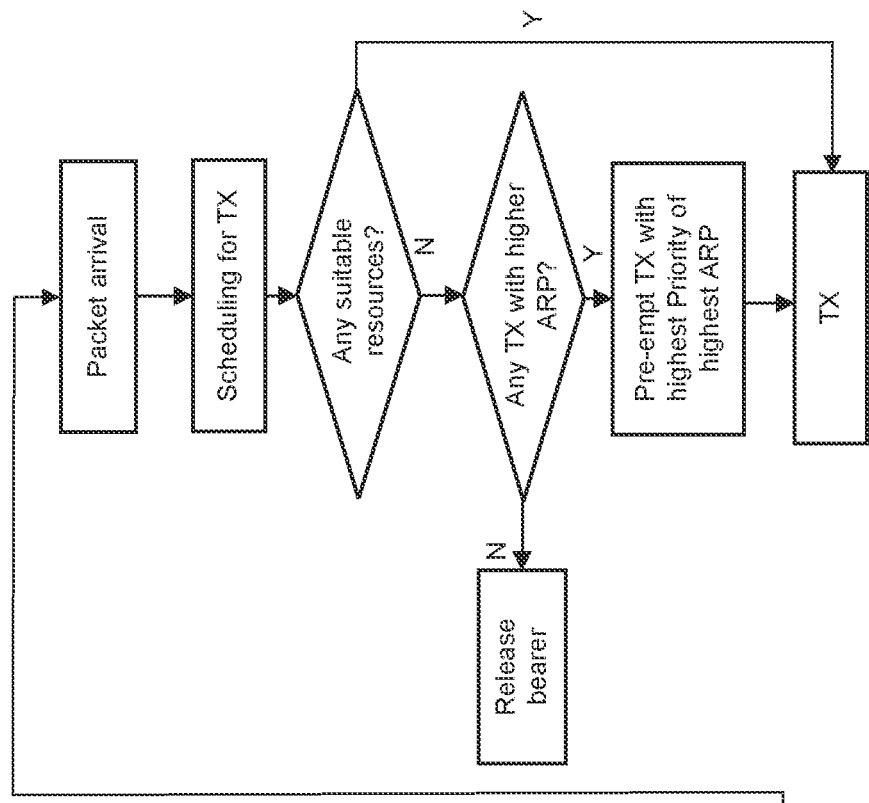
FIG. 2 illustrates a flowchart of operations for establishing a bearer and transmission of a packet according to some embodiments.
Figure 2:
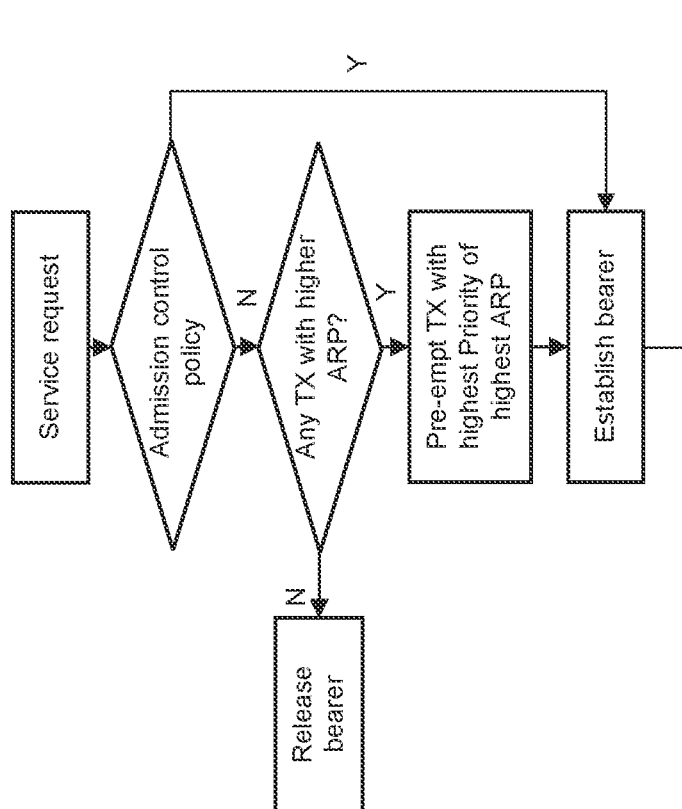

2. Admission Control and Packet Preemption Procedure:

The procedure to realize admission control and packet preemption for SL in autonomous mode is disclosed in this subsection. FIG. 2 illustrates a flowchart of operations for establishing a bearer and transmission of a packet according to some embodiments. The operational steps are described through the following differentiating bearer establishment procedure and packet handling procedure.

2.1 Bearer Establishment

As explained in section 1, each V2X service has its corresponding ARP and PL indicated by, e.g, 5QI. When one UE attempts to activate one type of V2X service and there is no suitable SL bearer available, it will try to establish a new SL bearer. The UE checks whether the admission control policy is fulfilled. Up to implementation, for instance, whether the available resources and channel conditions are enough to support required QoS, e.g. reliability, latency, data rate. For example, on the basis of the ARQ and/or PL associated to this bearer and the currently experienced congestion and/or interference on different available carriers, the bearer is selectively established or not established, i.e. admission control is selectively fulfilled or not fulfilled. Different thresholds on the congestion and/or interference level (e.g. RSSI, RSRP, RSRQ, Congestion Busy Ratio (CBR)) for different ARQ and/or PL may be preconfigured for use in these operations. If the congestion and/or interference level for the concerned ARP and/or PL is below the threshold the bearer can be established for the concerned ARP and/or PL, otherwise it is not.

If the admission control policy is fulfilled, the UE establishes the new SL bearer. In one example operation, the newly established SL bearer is kept until any one or a combination of any two or more of the following conditions occurs, after which the bearer is released:

1. The inter-arrival time duration at the UE side between packets belonging to the same SL bearer, i.e. mapped to the same QoS flow, is larger than a defined time threshold. This means that the UE did not receive any new packet associated to the same SL bearer for a time duration larger than X.
2. The time life of the SL bearer since the time it was established is larger than a defined configured threshold.
3. Channel conditions are not satisfactory for the quality of service (e.g., ARP and/or QCI) associated to this SL bearer, in any of the carriers available for transmission of the V2X service associated to this SL bearer. The congestion and/or interference threshold for each ARP and/or QCI defined above for the admission control policy may be used, if the congestion and/or interference is below the threshold the bearer can be established, if it is above for an already established bearer, the bearer is released. Alternatively, different thresholds may be used for the bearer admission and bearer release. For example, if the congestion for the concerned ARP and/or 5QI is below a threshold A, the bearer can be established, and, in contrast, if it is above a second threshold B the bearer is released, where threshold B is associated to a higher congestion/interference level than threshold A. If the interference and/or congestion for the concerned ARP and/or PL is above threshold A and below threshold B, the SL bearer which has been previously established shall be kept and not released.

In contrast, if the admission control policy is not fulfilled, the UE responsively tries to identify other on-going intra-UE or inter-UE transmissions with higher ARP value based on the SCI received from other SL UEs during the channel sensing/monitoring procedure and mark them to indicate they are pre-emption candidates. If there are not enough pre-emption candidates available, meaning resources will not be enough even after preemption, the UE will stop establishing the bearer and deactivate the V2X service.

However, if there are enough candidates available, among those pre-emption candidates, the UE starts to pre-empt booked transmissions. In one embodiment, the operation to pre-empt booked transmission can be performed by first pre-empting transmissions of those with highest ARP. Then, among transmissions with the same ARP, those with the highest PL are preempted first. Further related operation are disclosed in section 3 below.

For example, the UE may compute the SL resources currently used by the SL grants already allocated for one or more SL bearers. Among such SL grants the UE selects the grant which occupies the minimum number of resources necessary to fulfill the QoS of the SL bearer to be admitted. The SL bearer whose data are delivered via the selected SL grant is preempted. In another example, the UE selects the SL bearers to be preempted by starting from the resources occupied by the SL bearer which has lowest priority (ARP and/or PL), then the SL bearer which has second lowest priority, and so on, until the minimum amount of resources needed to deliver the QoS of the SL bearer to be admitted is selected. The UE does not consider as candidate for preemption the SL bearers having higher priority than the SL bearer to be admitted.

A bearer cannot be preempted if any of the following events occurs:

1. The bearer cannot be preempted if associated to traffic which cannot be preempted, e.g. preemption vulnerable flag appended for the corresponding bearer.
2. A bearer cannot be preempted if of higher priority than the SL bearer to be admitted.

3. A bearer cannot be preempted by a SL bearer which is not pre-emption capable, i.e. a pre-emption capable flag is appended to the bearer to be admitted.
4. A bearer cannot be preempted, if the time elapsed since when it was established is less a defined threshold.
5. A bearer cannot be preempted, if the incoming packet flow rate is higher than a defined rate.

After preemption, the UE establishes the new SL bearer.

Figure 6:
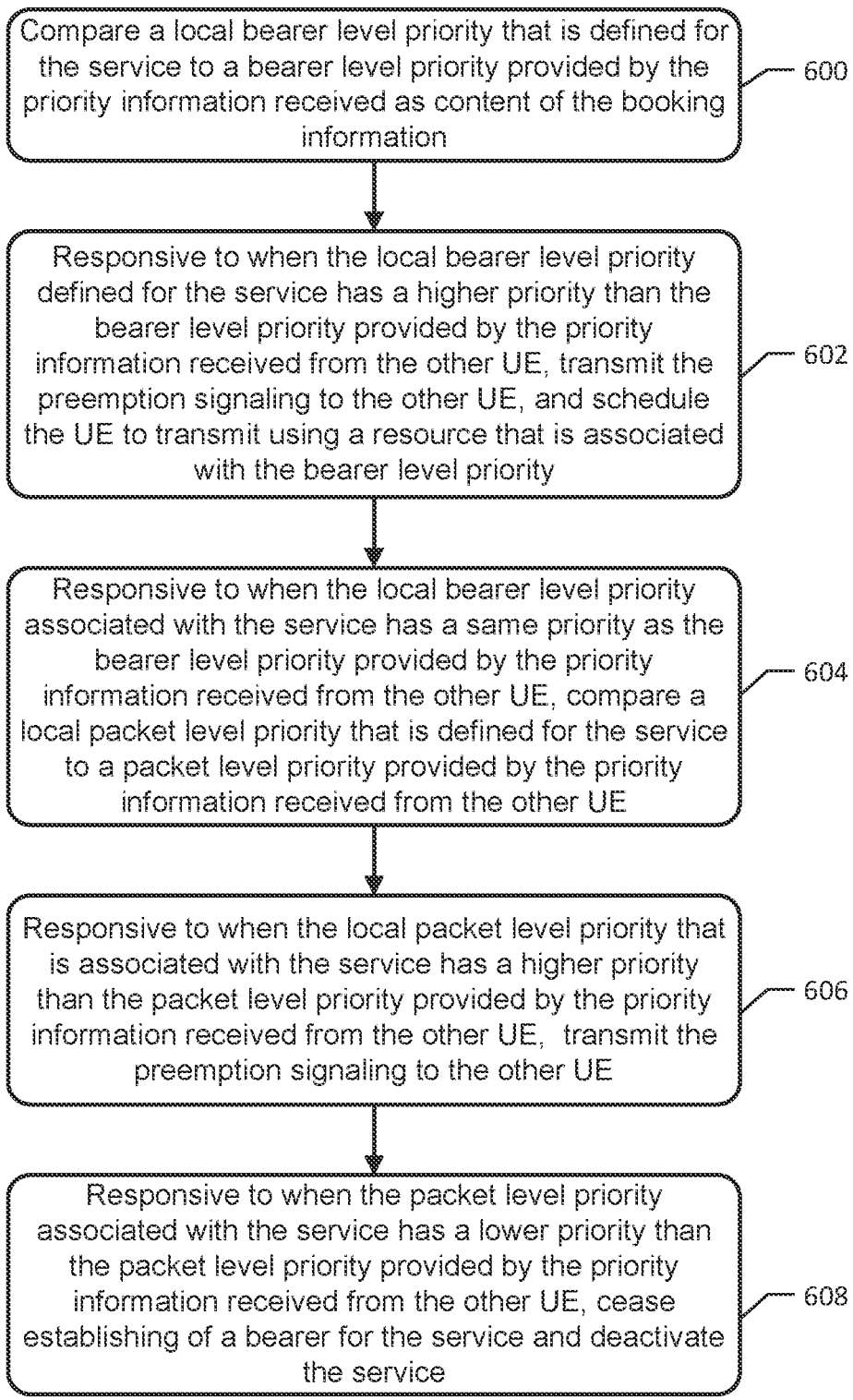
FIG. 6 is a flowchart of operations that can be performed by a UE to control SL bearer establishment in accordance with some embodiments.

FIG. 6 is a flowchart of operations that can be performed by a UE to control SL bearer establishment in accordance with some embodiments.

Referring to FIG. 6, the operation to selectively transmit preemption signaling based on whether the received priority information indicates lower priority than the local priority information that is associated with a transmission to be scheduled by the UE, can include:
1. Responsive to an attempt to activate a service and a determination that there are not enough available channel resources to support a defined QoS for the service, the UE compares 600 a local bearer level priority that is defined for the service to a bearer level priority provided by the priority information received as content of the booking information.
2. Responsive to when the local bearer level priority defined for the service has a higher priority than the bearer level priority provided by the priority information received from the other UE, the UE transmits 602 the preemption signaling to the other UE.

The operation to schedule the UE to transmit using the resource identified by the booking information, can include scheduling 602 the UE to transmit using a resource that is associated with the bearer level priority provided by the priority information received from the other UE.

The operation to selectively transmit preemption signaling based on whether the received priority information indicates lower priority than the local priority information that is associated with a transmission to be scheduled by the UE, can include:
1. Responsive to when the local bearer level priority associated with the service has a same priority as the bearer level priority provided by the priority information received from the other UE, the UE compares 604 a local packet level priority that is defined for the service to a packet level priority provided by the priority information received from the other UE.
2. Responsive to when the local packet level priority that is associated with the service has a higher priority than the packet level priority provided by the priority information received from the other UE, the UE transmits 606 the preemption signaling to the other UE.

The operation to selectively transmit preemption signaling based on whether the received priority information indicates lower priority than the local priority information that is associated with a transmission to be scheduled by the UE, can further include, responsive to when the packet level priority associated with the service has a lower priority than the packet level priority provided by the priority information received from the other UE, the UE ceases 608 establishing of a bearer for the service and deactivates the service.

The service described above may be a vehicle to anything (V2X) service.

2.2 Packet Handling

Assuming the bearer is successfully established, when a new packet arrives, the UE will try to schedule suitable resources for transmission.

If suitable resources are found, transmission will be scheduled, and ARP and PL will be included in SCI. Note that the SCI can be transmitted in the same slot together with data transmission and/or can also be included in a dedicated SCI before the actual transmission (aka. Pre-emption or resource reservation control signal).

If the channel becomes congested and not enough resources are identified, the UE responsively operates to try to identify other on-going intra-UE or inter-UE packet transmission with a higher ARP value based on the SCI received from other SL UEs and mark them to indicate they are pre-emption candidates. The same criteria explained above which is applied for the bearer case can be used to preempt a single packet depending on the characteristics (e.g. ARP/PL) of the packet to be transmitted.

If there are not enough pre-emption candidates available, meaning there still won't be sufficient resources even after preemption, the UE will release the bearer and deactivate the V2X service. In another example, the UE releases the bearer only if preemption of different packets associated to a certain SL bearer has occurred more than a certain number of times during the last X seconds, of if different packets associated to a certain SL bearer have been preempted for a certain number of consecutive times. Otherwise only the single packet is preempted, not the whole SL bearer.

However, if there are enough candidates available, among those pre-emption candidates, the UE starts to pre-empt booked transmissions. In one embodiment, the operation to preempt booked transmission can be performed by first pre-empting transmissions of those with highest ARP. Then, among transmissions with the same ARP, those with the highest PL are preempted first. Further related operation are disclosed in section 3 below. The same criteria explained above which is applied for the SL bearer to select the necessary number of resources can be used in this case.

After preemption, the UE transmits the packet using preempted resources, and ARP and PL will be included in SCI.

Figure 3:
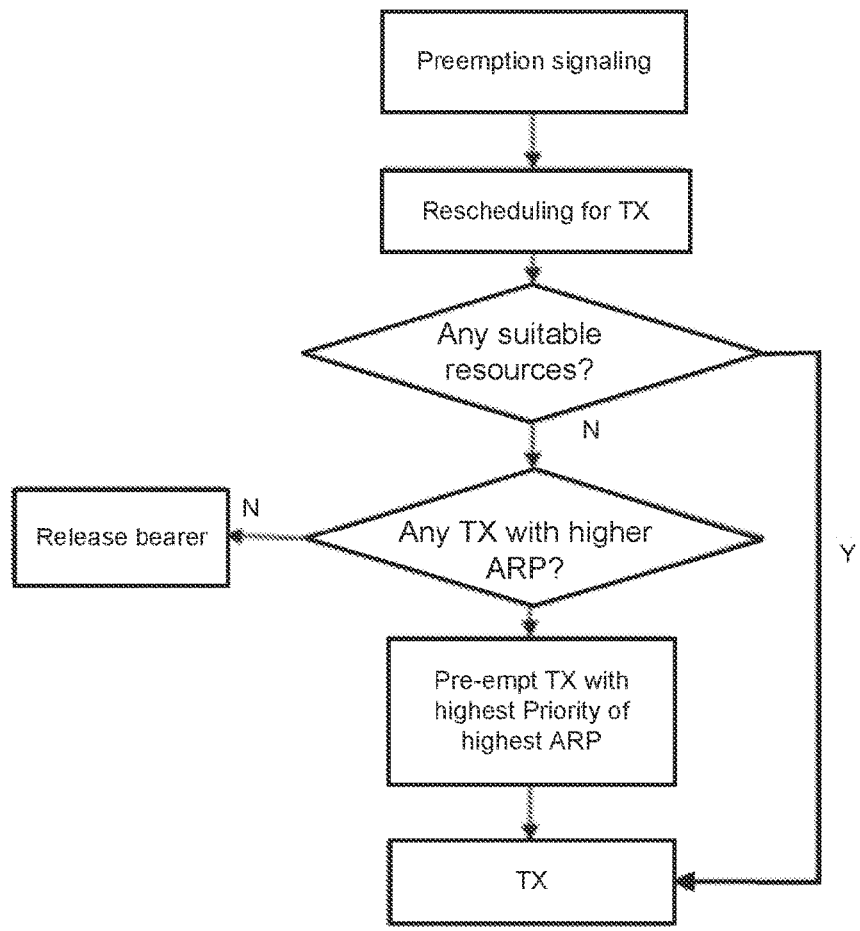
FIG. 3 illustrates a flowchart of operations for rescheduling after being preempted, according to some embodiments.

Note that, when the channel is congested, one UE does not preempt other UEs' bearers, instead it preempts booked transmissions of other UEs, and whether the packet preemption will lead to a bearer drop depends on the preempted UE. FIG. 3 illustrates a flowchart of operations for rescheduling after being preempted, according to some embodiments. Referring to FIG. 3, the UE whose booked transmission gets preempted will try to reschedule its packet transmissions following the packet handling procedure as described above. The UE will release the bearer and deactivate the V2X only when there are not enough resources available and there are not enough preemption candidates.

Various related operational embodiments will be described in the context of UE packet preemption procedures.

Based on having established a radio bearer for use by a service and responsive to obtaining a new packet that is to be scheduled for transmission and when the radio channel is determined to be not congested according to a defined rule, the UE can transmit the new packet and priority information. As explained above, the priority information can indicate a bearer level priority and a packet level priority. The priority information may be transmitted as sidelink control information in a same slot as the new packet. Alternatively, the priority information can be transmitted as sidelink control information in a slot that precedes a later slot in which the new packet is transmitted.

Figure 7:
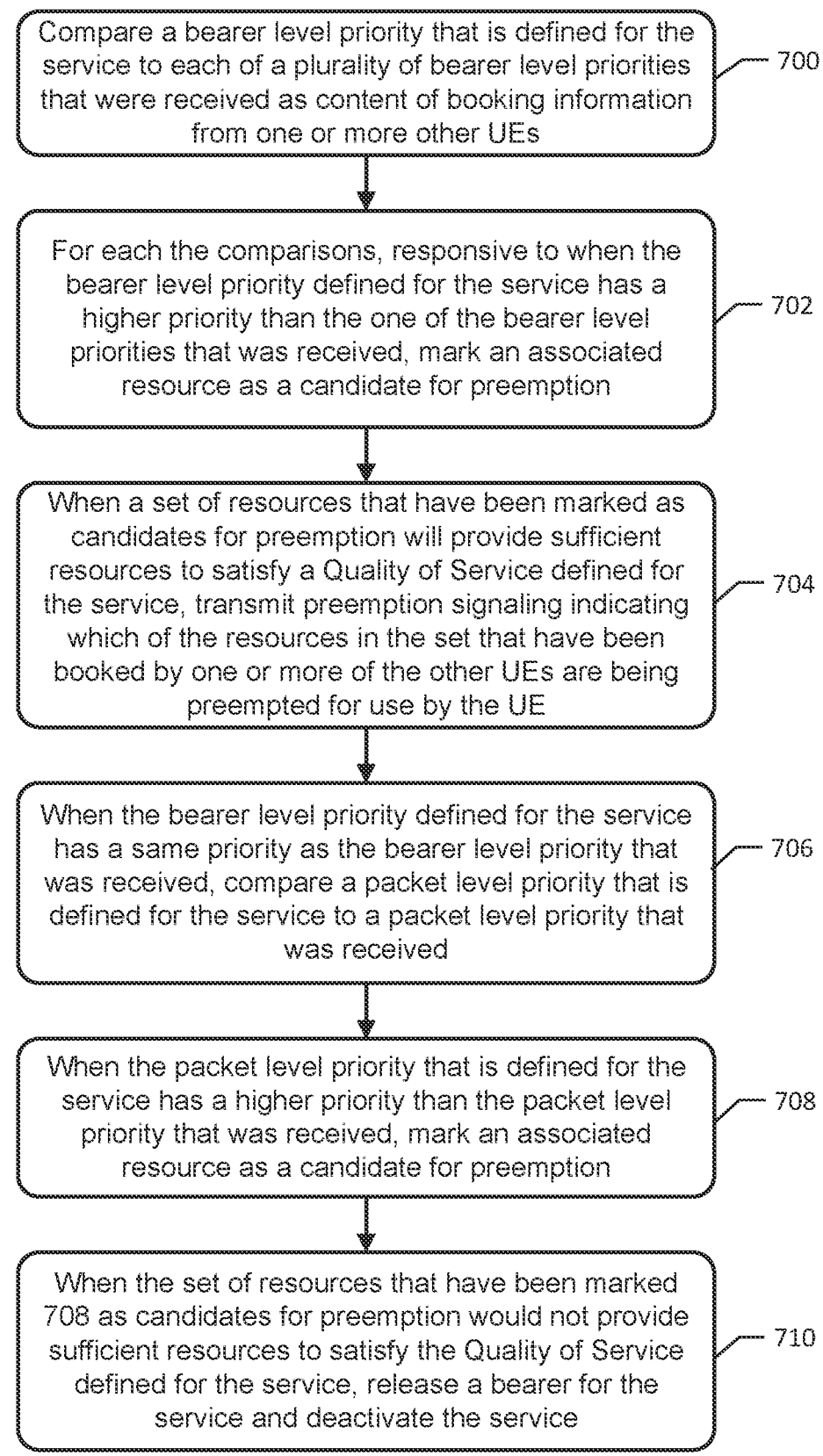
FIG. 7 is a flowchart of operations that can be performed by a UE to control SL transmission packet handling in accordance with some embodiments.

FIG. 7 is a flowchart of operations that can be performed by a UE to control SL transmission packet handling in accordance with some embodiments.

Referring to FIG. 7, based on having established the radio bearer for use by the service and responsive to having obtained the new packet that is to be scheduled for transmission and when the radio channel is determined to have become congested according to the defined rule, the UE can perform operations that include:

1. comparing 700 a bearer level priority that is defined for the service to each of a plurality of bearer level priorities that were received as content of booking information from one or more other UEs.
2. for each the comparisons 700, responsive to when the bearer level priority defined for the service has a higher priority than the one of the bearer level priorities that was received, marking 702 an associated resource as a candidate for preemption.
3. when a set of resources that have been marked as candidates for preemption will provide sufficient resources to satisfy a Quality of Service defined for the service, transmitting 704 preemption signaling indicating which of the resources in the set that have been booked by one or more of the other UEs are being preempted for use by the UE.

The UE can further include, for each the comparisons 700, responsive to when the bearer level priority defined for the service has a same priority as the bearer level priority that was received, compare 706 a packet level priority that is defined for the service to a packet level priority that was received. Responsive to when the packet level priority that is defined for the service has a higher priority than the packet level priority that was received, the UE marks 708 an associated resource as a candidate for preemption.

Responsive to when the set of resources that have been marked 708 as candidates for preemption would not provide sufficient resources to satisfy the Quality of Service defined for the service, the UE releases 710 a bearer for the service and deactivates the service.

As explained above, the service may be a vehicle to anything (V2X) service.

3 Packet Preemption Signaling

To avoid severe interference, preemption may be performed to target booked resources and to not disturb already scheduled transmissions, which can/will happen in any case.

When applicable, the transmission booking information is carried in SCI. One UE can be aware of other UEs' booked transmissions by decoding SCIs during a defined sensing/monitoring procedure. Once one UE wants to preempt another UE's booked resources, it responsively transmits a preemption signaling (or any other control signaling) via, e.g., Physical Sidelink Control Channel (PSCCH). The preemption signaling may carry, for example, ARP, PL and the resource index which the UE wants to preempt.

Other UEs who receive the preemption signaling will first check whether the preempted resources are booked by them. If their booked resources are preempted, they will try to reschedule the transmission as described in section 2 above.

Figure 4:
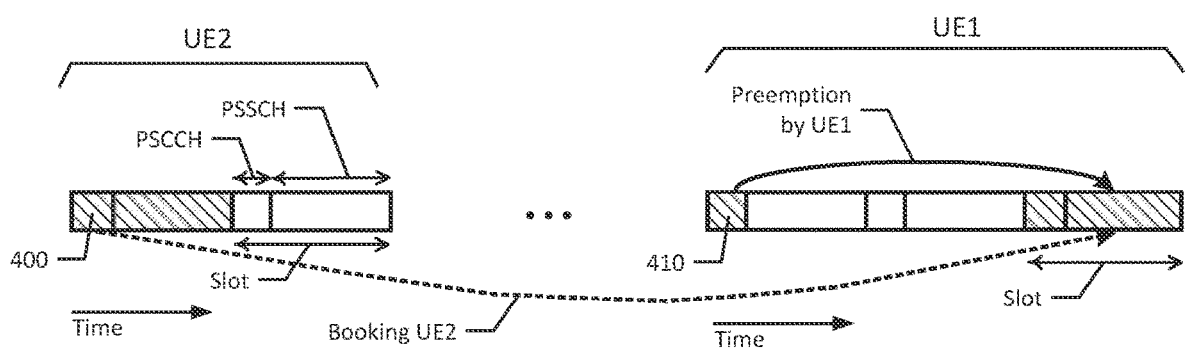
FIG. 4 illustrates operations that are performed by a first UE and a second UE over time to book resources and preempt such bookings in accordance with some embodiments.

FIG. 4 illustrates operations that are performed by a first UE (UE1) and a second UE (UE2) over time to book resources and preempt such bookings in accordance with some embodiments. Referring to FIG. 4, UE2 transmits booking information 400 (e.g., SCI) which indicates an intention to transmit data and control information using a set of resources in the booked "Slot." UE1 receives the booking information 400 (e.g., SCI) according to a defined sensing/monitoring procedure, and based on the priority indication therein (e.g., bearer level priority and packet level priority) UE1 determines using the priority based preemption operations described above that it will preempt UE2's booked transmission planned for "Slot", so that UE1 can transmit data and control information during the booked "Slot." UE1 transmits preemption signaling (or any other control signaling) 410, e.g., via PSCCH, to indicate to UE2 that UE1 is preempting (preventing) UE2's use of "Slot" for transmission. UE1 then transmits data and control information using the time-frequency resources during the "Slot." UE2 responds to receipt of the preemption signaling (or any other control signaling) 410 by trying to reschedule its packet transmissions following the packet handling procedure as described above.

Figure 8:
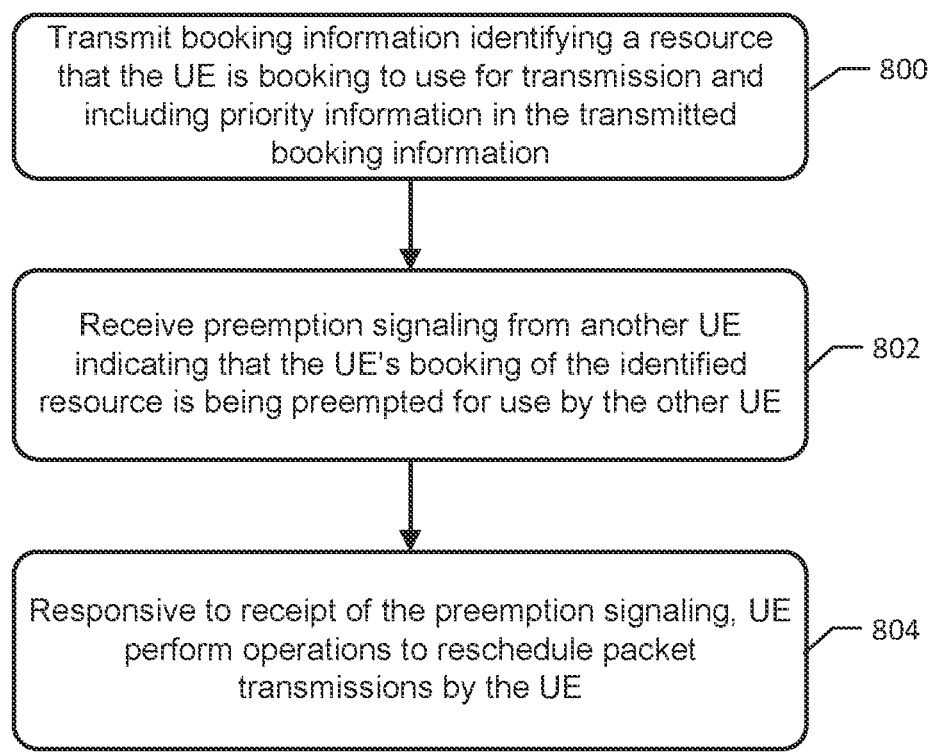
FIG. 8 is a flowchart of operations that can be performed by a UE for packet preemption signaling in accordance with some embodiments.

FIG. 8 is a flowchart of operations that can be performed by a UE for packet preemption signaling in accordance with some embodiments. With reference to FIGS. 4 and 8, the operations include the UE (US2) transmitting 800 booking information identifying a resource that the UE (UE2) is booking to use for transmission and including priority information in the transmitted booking information. The UE (UE2) receives 802 preemption signaling from another UE (UE1) indicating that the UE's (US2) booking of the identified resource is being preempted for use by the other UE (UE1). Responsive to receipt of the preemption signaling, the UE (UE2) performs operations to reschedule 804 packet transmissions by the UE (UE2).

Figure 9:
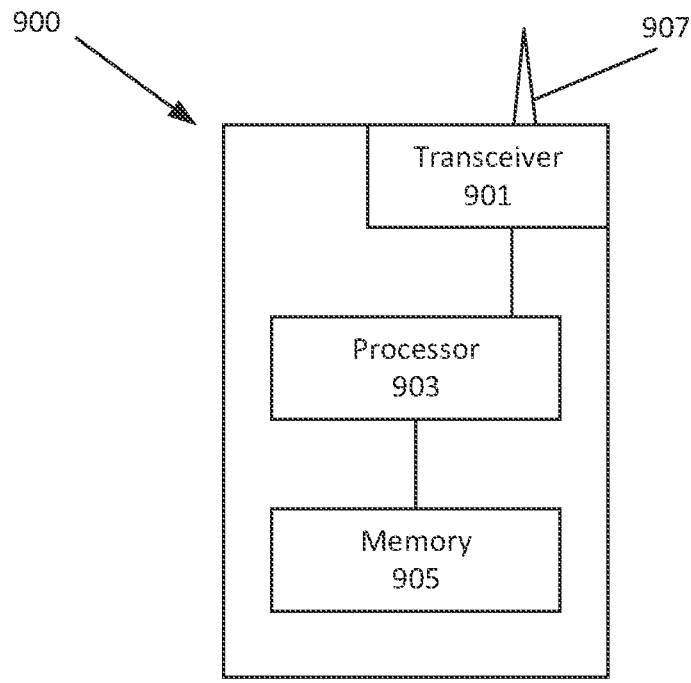
FIG. 9 is a block diagram illustrating a wireless device UE having components configured according to some embodiments.

FIG. 9 is a block diagram illustrating elements of a wireless device UE 900 (also referred to as a wireless terminal, a wireless communication device, a wireless communication terminal, user equipment, UE, a user equipment node/terminal/device, etc.) configured to provide wireless communication according to embodiments of inventive concepts. As shown, the UE may include an antenna 9007, and a transceiver circuit 9001 (also referred to as a transceiver) including a transmitter and a receiver configured to provide uplink and downlink radio communications with other UEs (e.g., SL communications), a radio access network RAN node (e.g., a base station, eNB, gNB, network node, etc.) of a wireless communication network. UE 900 may also include a processor circuit 903 (also referred to as a processor) coupled to the transceiver circuit, and a memory circuit 905 (also referred to as memory) coupled to the processor circuit. The memory circuit 905 may include computer readable program code that when executed by the processor circuit 903 causes the processor circuit to perform operations according to embodiments disclosed herein. According to other embodiments, processor circuit 3 may be defined to include memory so that a separate memory circuit is not required. UE 900 may also include an interface (such as a user interface) coupled with processor and a three, and/or wireless device UE may be an IoT and/or MTC device.

As discussed herein, operations of wireless device UE 900 may be performed by processor 903 and/or transceiver 901. For example, processor 903 may control transceiver 901 to transmit uplink communications through transceiver 901 over a radio interface to another UE and/or a RAN node of a wireless communication network and/or to receive downlink communications through transceiver 901 from another UE and/or a RAN node of the wireless communication network over a radio interface. Moreover, modules may be stored in memory 905, and these modules may provide instructions so that when instructions of a module are executed by processor 903, processor 903 performs respective operations (e.g., operations discussed below with respect to Example Embodiments).

Listing of Embodiments

1. A method of operating a user equipment, UE, for device-to-device, D2D, communications, the method comprising:
   receiving (500) booking information from another UE, the booking information identifying a resource that the other UE is booking to use for transmission by the other UE and further including priority information;
   selectively transmitting (502) preemption signaling based on whether the received priority information indicates lower priority than local priority information that is associated with a transmission to be scheduled by the UE, wherein the preemption signaling indicates preemption of the UE to use the resource identified by the booking information; and
   scheduling (504) the UE to transmit using the resource identified by the booking information.
2. The method of Embodiment 1, wherein:
   the priority information comprises bearer level priorities for bearers as content of the booking information; and
   the operation to selectively transmit preemption signaling, comprises selectively transmitting the preemption signaling based on comparison of the received bearer level priorities for the bearers to a local bearer level priority.
3. The method of Embodiment 2, further comprising:
   for each of the bearers, controlling establishment and release of the bearer by the UE responsive to comparison of the received bearer level priority for the bearer to the local bearer level priority.
4. The method of any of Embodiments 1 to 3, wherein:
   the priority information comprises a packet level priority as content of the booking information; and
   the operation to schedule the UE to transmit using the resource identified by the booking information, comprises scheduling a packet for transmission that is selected among a plurality of queued packets based on comparison of the received packet level priority to packet level priorities of the queued packets.
5. The method of any of Embodiments 1 to 4, wherein:
   the local priority information comprises a local bearer level priority indicator for a SL bearer and a local packet level priority indicator, wherein the local bearer level priority and the local packet level priority are mapped to a service, and wherein the mapping is received from a network node.
6. The method of Embodiment 5, further comprising:
   receiving the mapping in at least one system information block or at least one radio resource control block from the network node.
7. The method of any of Embodiments 1 to 6, wherein:
   the received priority information comprises a bearer level priority indicator for a SL bearer and a packet level priority indicator, and the booking information is received in sidelink control information from the other UE.
8. The method of any of Embodiments 1 to 7, wherein:
   the local priority information comprises a bearer level priority indicator for a SL bearer and a packet level priority indicator, which are determined based on UE subscription information and/or based on a service level agreement for the UE.
9. The method of any of Embodiments 1 to 8,
   wherein the operation to selectively transmit preemption signaling based on whether the received priority information indicates lower priority than the local priority information that is associated with a transmission to be scheduled by the UE, comprises:
   responsive to an attempt to activate a service and a determination that there are not enough available channel resources to support a defined QoS for the service, comparing (600) a local bearer level priority that is defined for the service to a bearer level priority provided by the priority information received as content of the booking information; and
   responsive to when the local bearer level priority defined for the service has a higher priority than the bearer level priority provided by the priority information received from the other UE, transmitting (602) the preemption signaling to the other UE; and
   wherein the operation to schedule the UE to transmit using the resource identified by the booking information, comprises:
   scheduling (602) the UE to transmit using a resource that is associated with the bearer level priority provided by the priority information received from the other UE.
10. The method of Embodiment 9, wherein the operation to selectively transmit preemption signaling based on whether the received priority information indicates lower priority than the local priority information that is associated with a transmission to be scheduled by the UE, further comprises:
    responsive to when the local bearer level priority associated with the service has a same priority as the bearer level priority provided by the priority information received from the other UE, comparing (604) a local packet level priority that is defined for the service to a packet level priority provided by the priority information received from the other UE; and
    responsive to when the local packet level priority that is associated with the service has a higher priority than the packet level priority provided by the priority information received from the other UE, transmitting (606) the preemption signaling to the other UE.
11. The method of Embodiment 10, wherein the operation to selectively transmit preemption signaling based on whether the received priority information indicates lower priority than local priority information that is associated with a transmission to be scheduled by the UE, further comprises:
    responsive to when the packet level priority associated with the service has a lower priority than the packet level priority provided by the priority information received from the other UE, ceasing (60A) establishing of a bearer for the service and deactivating the service.
12. The method of any of Embodiment 9 to 11, wherein the service is a vehicle to anything, V2X, service.
13. The method of any of Embodiments 1 to 12, further comprising:
    based on having established a radio bearer for use by a service and responsive to obtaining a new packet that is to be scheduled for transmission and when the radio channel is determined to be not congested according to a defined rule, transmitting the new packet and priority information.
14. The method of Embodiment 13, wherein the priority information indicates a bearer level priority and a packet level priority.
15. The method of Embodiment 14, wherein the priority information is transmitted as sidelink control information in a same slot as the new packet.

16. The method of Embodiment 14, wherein the priority information is transmitted as sidelink control information in a slot that precedes a later slot in which the new packet is transmitted.

17. The method of any of Embodiments 1 to 13, further comprising:
based on having established the radio bearer for use by the service and responsive to having obtained the new packet that is to be scheduled for transmission and when the radio channel is determined to have become congested according to the defined rule, performing:
comparing (700) a bearer level priority that is defined for the service to each of a plurality of bearer level priorities that were received as content of booking information from one or more other UEs;
for each the comparisons (700), responsive to when the bearer level priority defined for the service has a higher priority than the one of the bearer level priorities that was received, marking (702) an associated resource as a candidate for preemption; and
when a set of resources that have been marked as candidates for preemption will provide sufficient resources to satisfy a Quality of Service defined for the service, transmitting (704) preemption signaling indicating which of the resources in the set that have been booked by one or more of the other UEs are being preempted for use by the UE.

18. The method of Embodiment 17, wherein for each the comparisons (700),
responsive to when the bearer level priority defined for the service has a same priority as the bearer level priority that was received, comparing (706) a packet level priority that is defined for the service to a packet level priority that was received, and
responsive to when the packet level priority that is defined for the service has a higher priority than the packet level priority that was received, marking (708) an associated resource as a candidate for preemption.

19. The method of Embodiment 18, wherein when the set of resources that have been marked as candidates for preemption would not provide sufficient resources to satisfy the Quality of Service defined for the service, releasing (710) a bearer for the service and deactivating the service.

20. The method of any of Embodiments 17 to 19, wherein the operation for marking (702) an associated resource as a candidate for preemption, comprises:
preventing marking (702) of any resource as a candidate for preemption when any one of the following conditions is determined to occur:
a bearer associated with the bearer level priority provided by the priority information has been defined as not be preemptable;
the priority information received from the other UE contains a flag indicating that an associated bear is not preemptable;
a time elapsed since when a bearer was established is less than a defined threshold; and
an incoming packet flow rate is higher than a defined rate.

21. The method of any of Embodiments 13 to 20, wherein the service is a vehicle to anything, V2X, service.

22. The method of any of Embodiments 1 to 21, further comprising:
transmitting (800) booking information identifying a resource that the UE is booking to use for transmission and including priority information in the transmitted booking information;

receiving (802) preemption signaling from another UE indicating that the UE's booking of the identified resource is being preempted for use by the other UE; and
responsive to receipt of the preemption signaling, performing operations to reschedule (804) packet transmissions by the UE.

23. The method of any of Embodiments 1 to 22, further comprising:
performing an admission control policy that comprises:
following establishment of a SL bearer for a service, releasing the SL bearer when any one of the following conditions occurs:
a) an inter-arrival time duration between receipt by the UE of packets belonging to the SL bearer is larger than a defined time threshold;
b) a time life of the SL bearer since a time when it was established is larger than a defined threshold; and
c) channel conditions are determined to not be satisfactory for an quality of service associated with the SL bearer.

24. A user equipment, UE, adapted to perform according to any of Embodiments 1 to 23.

25. A user equipment, UE, comprising:
transceiver;
a processor coupled to the transceiver; and
memory coupled with the processor, wherein the memory stores instructions that when executed by the processor causes the UE to perform operations according to any of Embodiments 1 to 23.

26. A computer program product, comprising:
a non-transitory computer readable storage medium comprising computer readable program code embodied in the medium that when executed by a processor of a user equipment, UE, causes the UE to perform operations according to any of Embodiments 1 to 23.

Explanations for abbreviations from the above disclosure are provided below.

Abbreviation Explanation

ARP Allocation and retention priority
CBR Channel busy ratio
CSI Channel state information
CSI-RS Channel state information reference signal
D2D Device to device
DCI Downlink control channel
DFN D2D frame number
DL Downlink
LCG Logical channel groups
NB Node B
NW Network
PL Priority level
ProSe Proximity services
PSCCH Physical sidelink control channel
PSSCH Physical sidelink shared channel
PPPP ProSe per-packet priority
PPPR ProSe per-packet reliability
QoS Quality of service
RS Reference signal
RRC Radio resource control
RSRP Reference signal received power
RSSI Received signal strength indication
SA Scheduling assignment
SCI Sidelink control information
SIB System information block
SL Sidelink SL-BSR Sidelink buffer status report
UE User equipment
UL Uplink
V2I Vehicle-to-infrastructure
V2N Vehicle-to-network
V2V Vehicle-to-vehicle
V2P Vehicle-to-pedestrian
V2X Vehicle-to-anything communication

REFERENCES 1. 3GPP 22.886 TR Study on enhancement of 3GPP support for 5G V2X services, Release 15, 2018.
2. 3GPP, TS 23.501 System Architecture for the 5G System; Stage 2, Release 15, 2018

Further definitions and embodiments are discussed below:

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
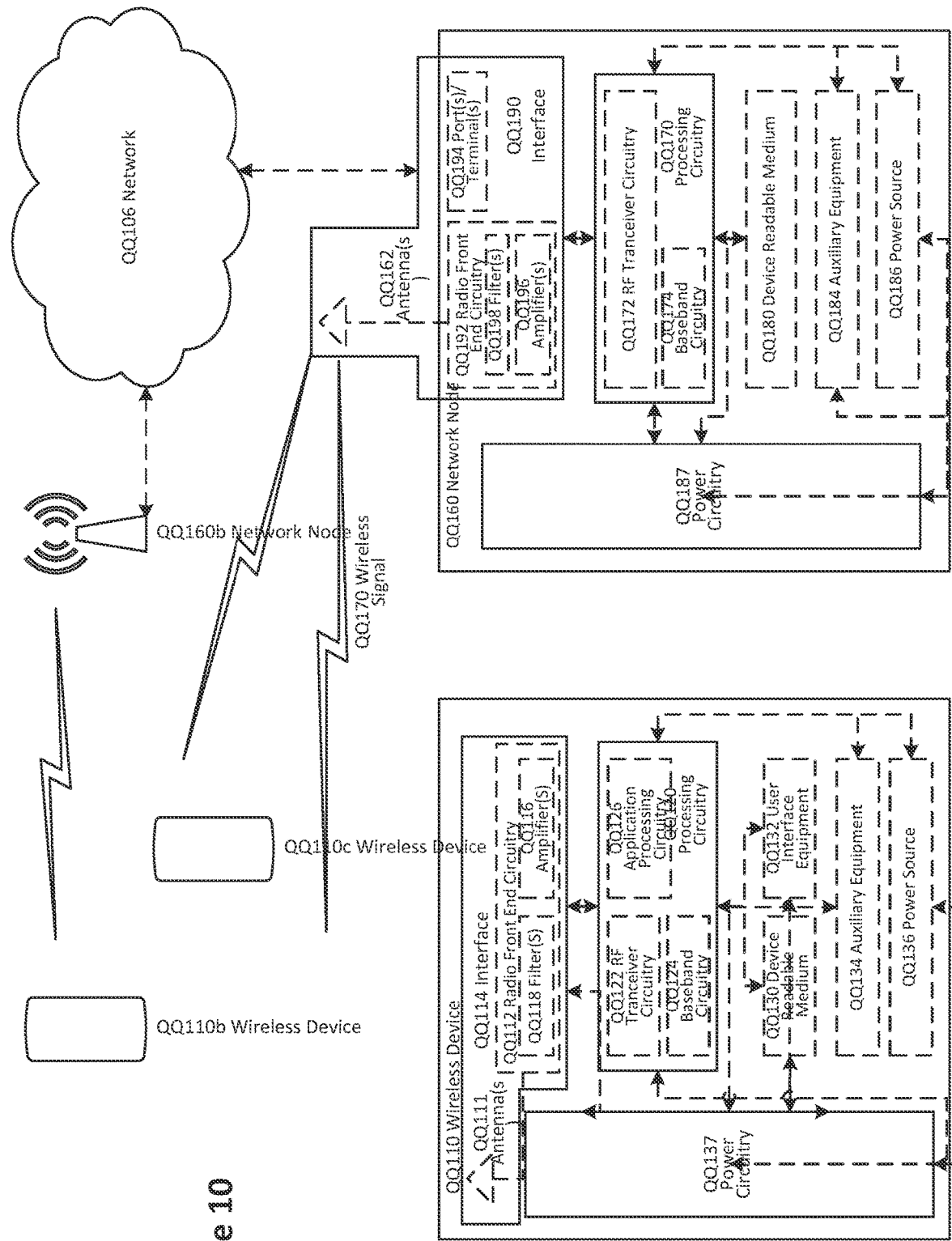
FIG. 10 is a block diagram of a wireless network in accordance with some embodiments.

FIG. 10: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 10 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 11:
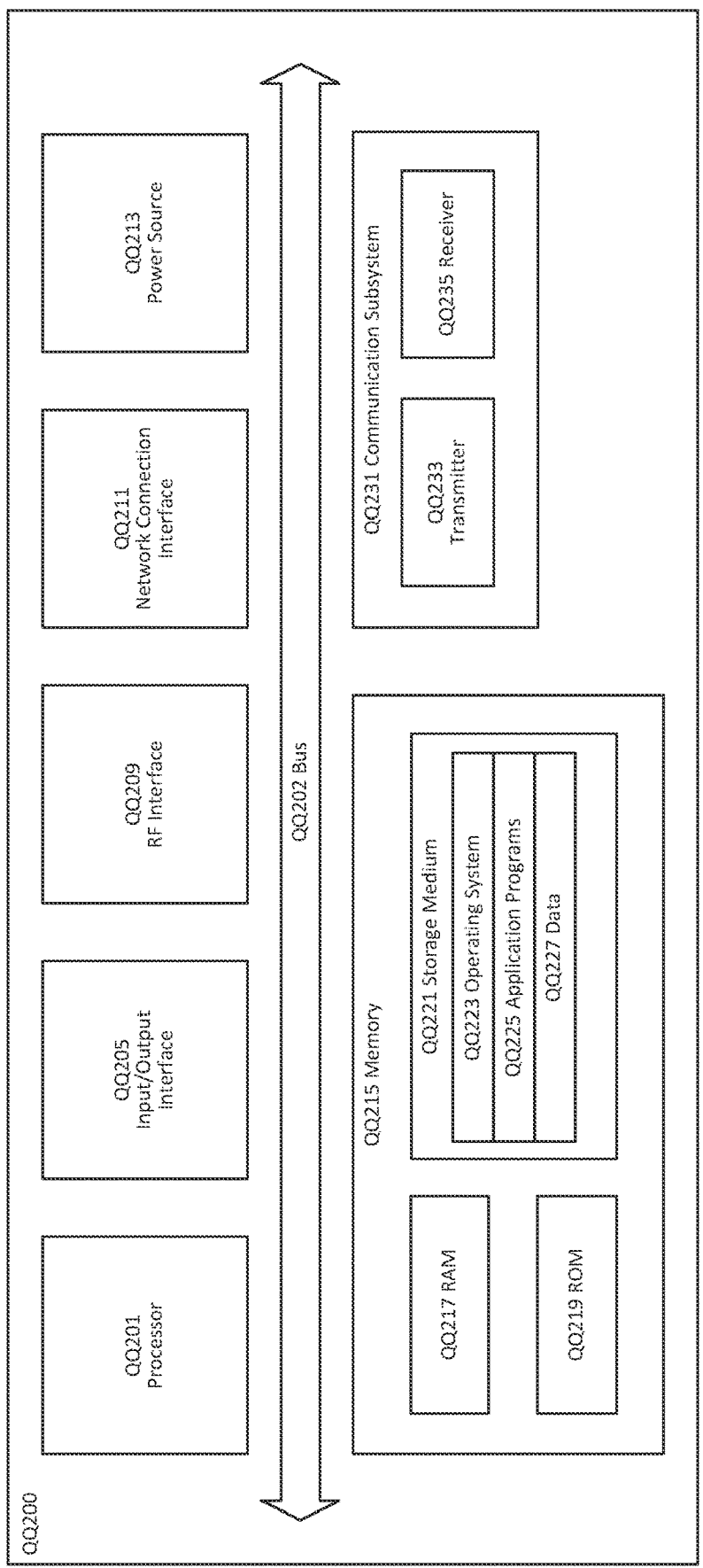
FIG. 11 is a block diagram of a user equipment in accordance with some embodiments

FIG. 11: User Equipment in accordance with some embodiments

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 11, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 12:
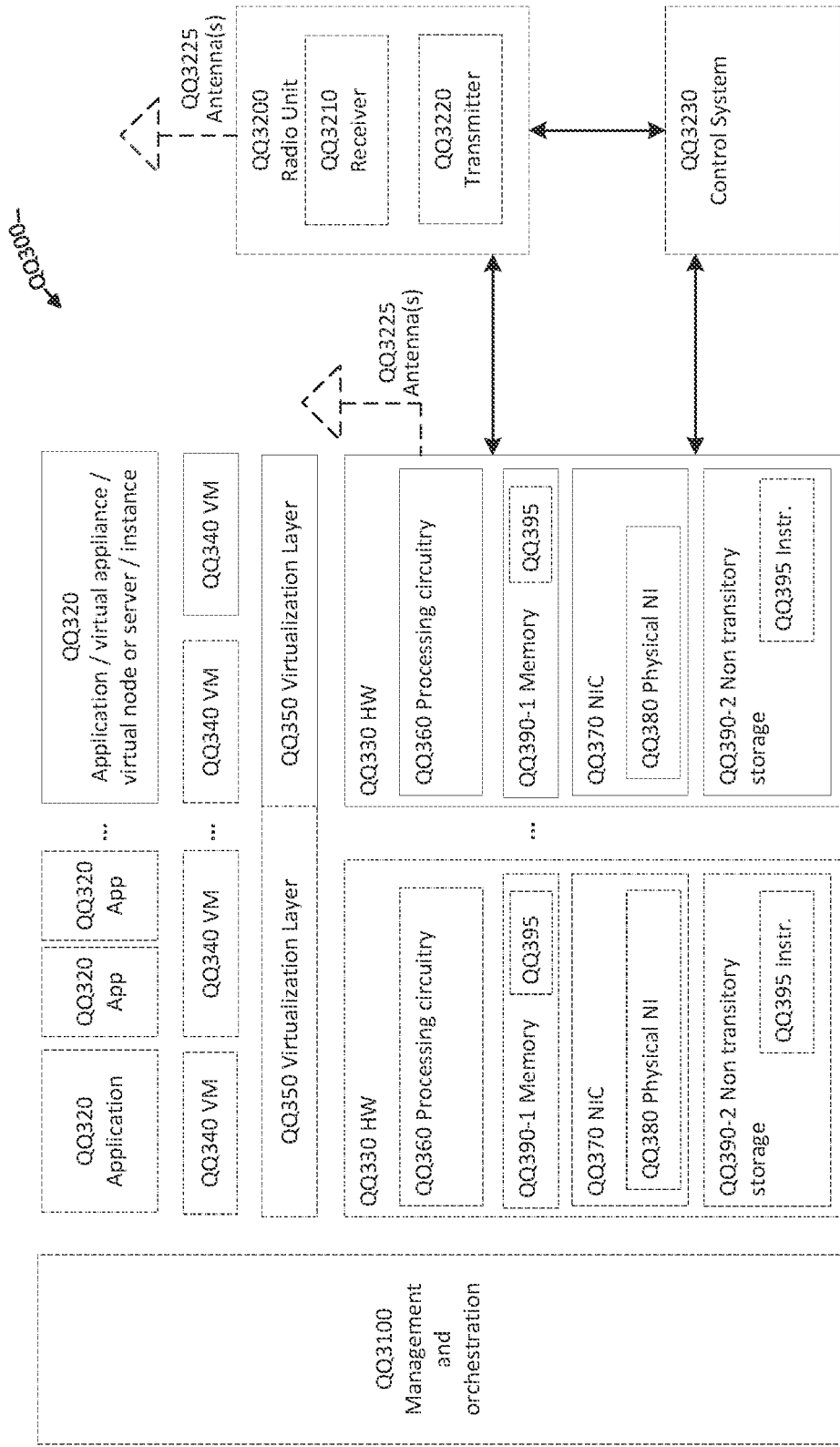
FIG. 12 is a block diagram of a virtualization environment in accordance with some embodiments.

FIG. 12: Virtualization environment in accordance with some embodiments

FIG. 12 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 12, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 12.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 13:
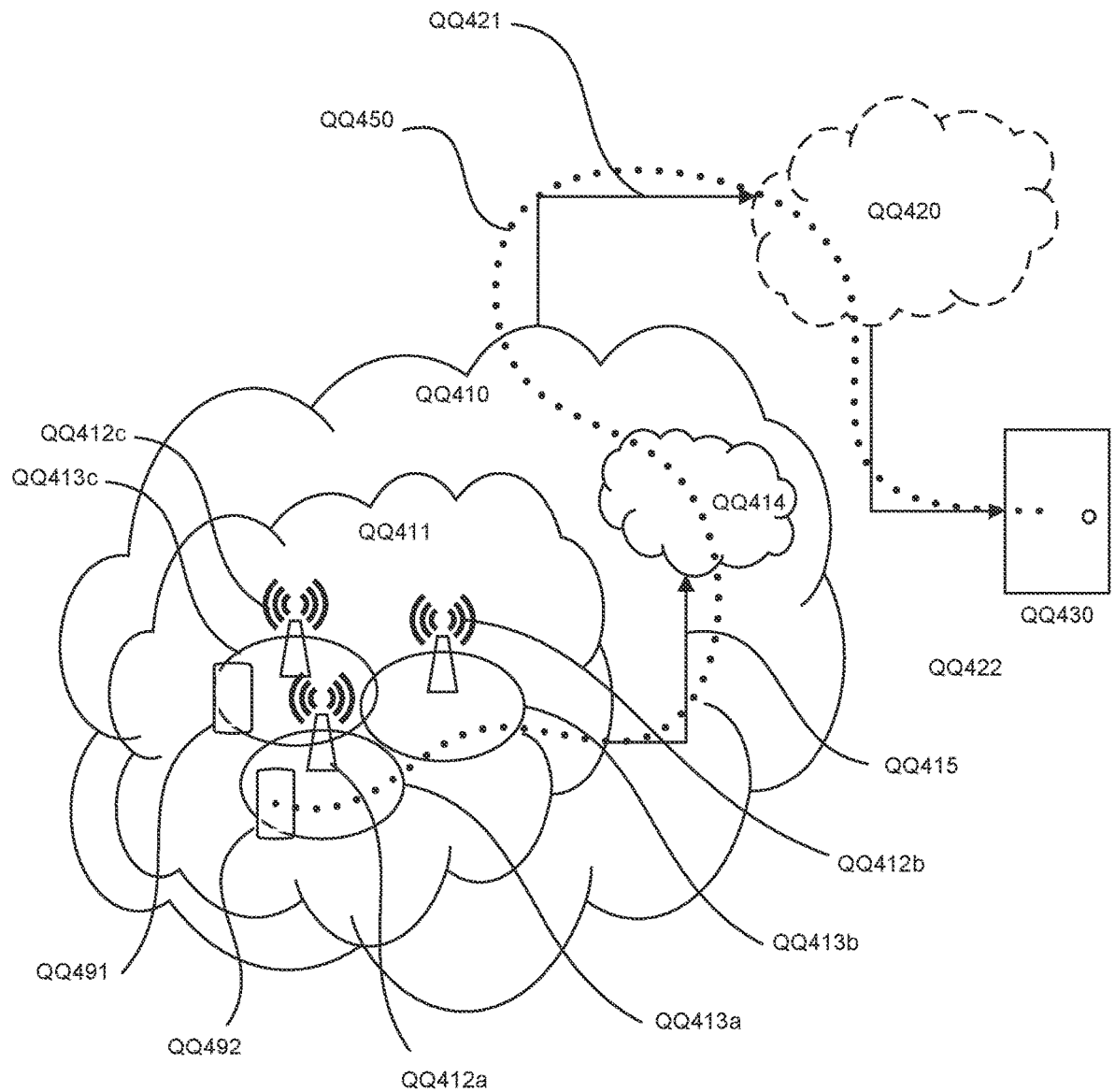
FIG. 13 is a block diagram of a telecommunication network connected via an intermediate network to a host computer in accordance with some embodiments.

FIG. 13: Telecommunication network connected via an intermediate network to a host computer in accordance with some embodiments.

With reference to FIG. 13, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 13 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 14:
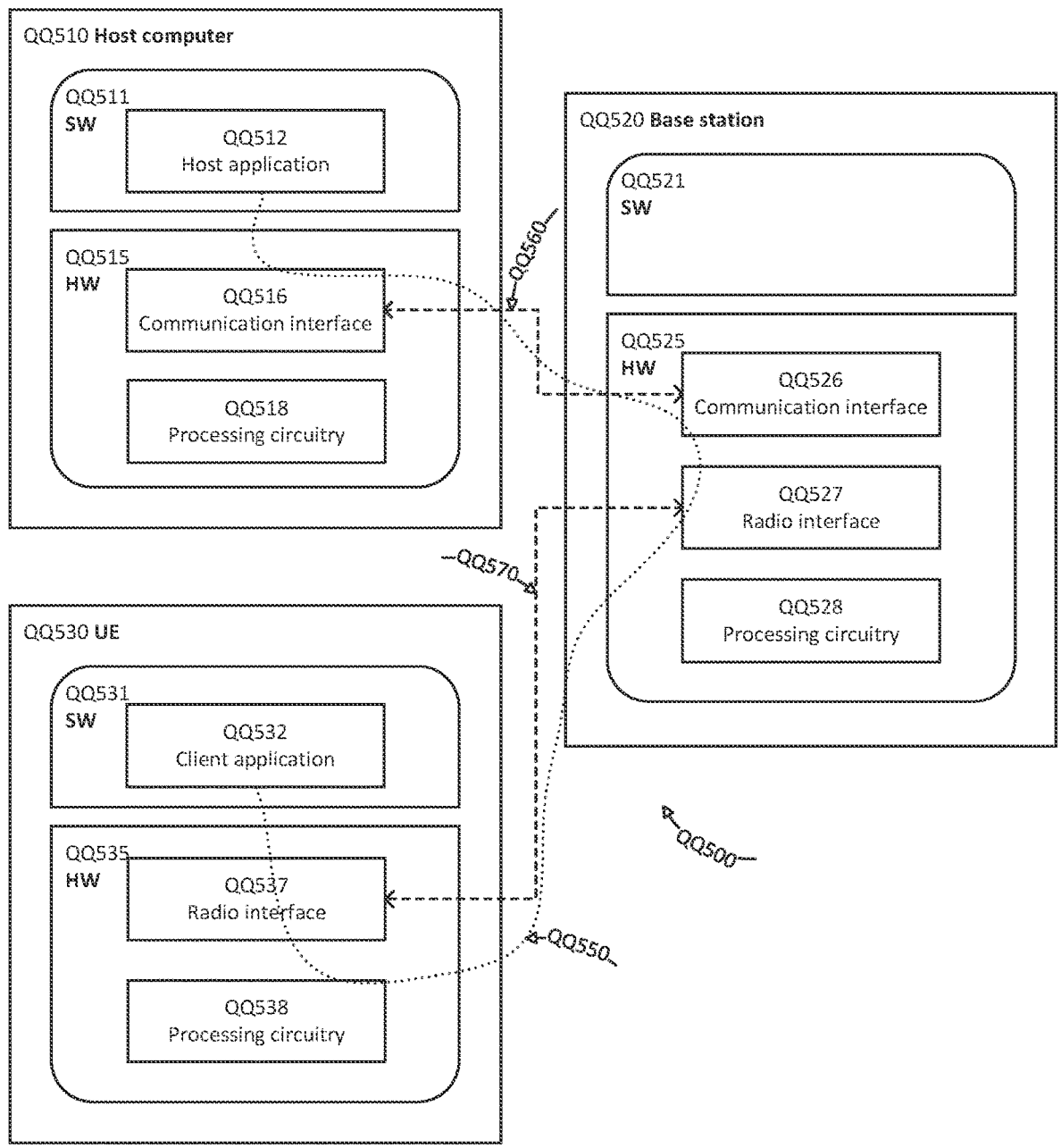
FIG. 14 is a block diagram of a host computer communicating via a base station with a user equipment over a partially wireless connection in accordance with some embodiments.

FIG. 14: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 14) served by base station QQ520. Communication interface QQ526 may be configured to facilitate connection QQ560 to host computer QQ510. Connection QQ560 may be direct or it may pass through a core network (not shown in FIG. 14) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 14 may be similar or identical to host computer QQ430, one of base stations QQ412a, QQ412b, QQ412c and one of UEs QQ491, QQ492 of FIG. 13, respectively. This is to say, the inner workings of these entities may be as shown in FIG. 14 and independently, the surrounding network topology may be that of FIG. 13.

In FIG. 14, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 15:
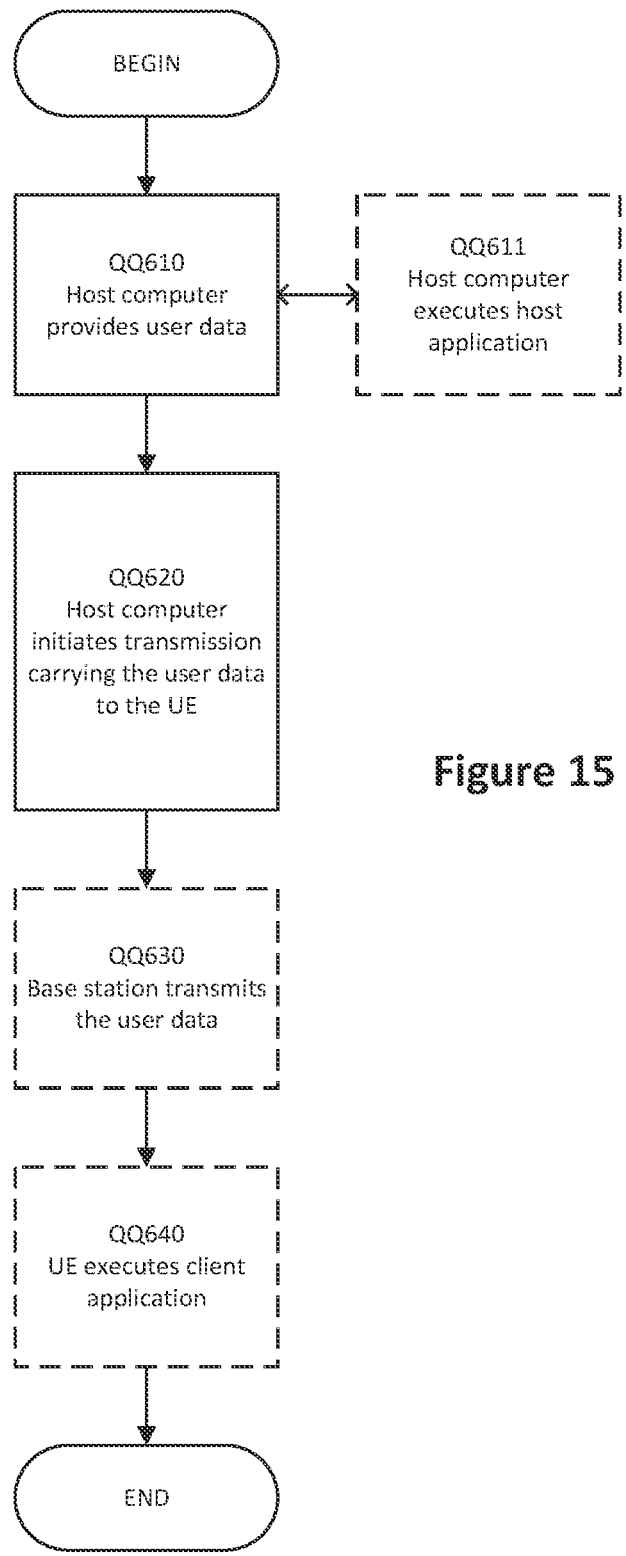
FIG. 15 is a block diagram of methods implemented in a communication system including a host computer, a base station and a user equipment in accordance with some embodiments.

FIG. 15: Methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 16:
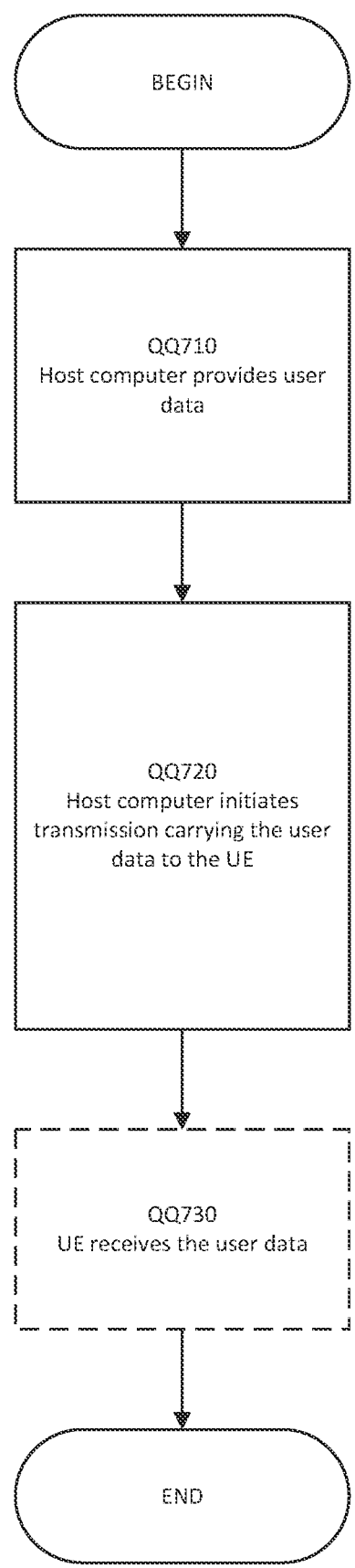
FIG. 16 is a block diagram of methods implemented in a communication system including a host computer, a base station and a user equipment in accordance with some embodiments.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 17:
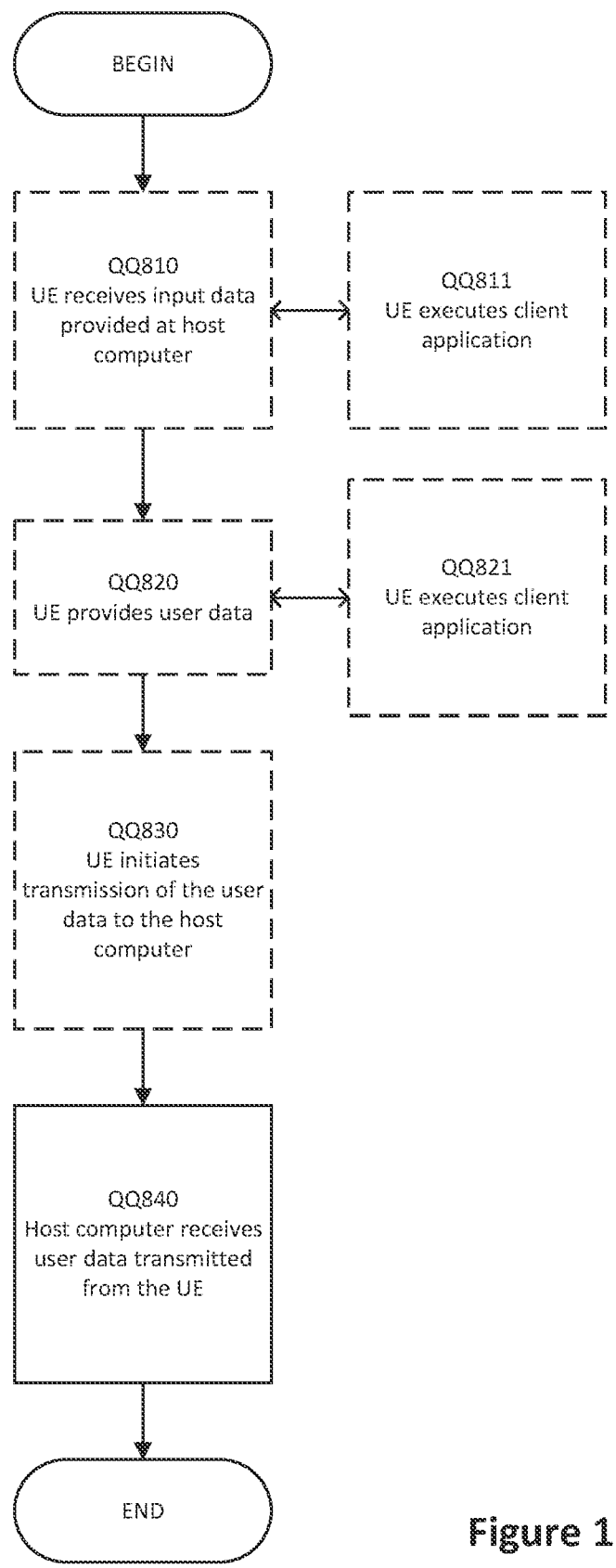
FIG. 17 is a block diagram of methods implemented in a communication system including a host computer, a base station and a user equipment in accordance with some embodiments.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 18:
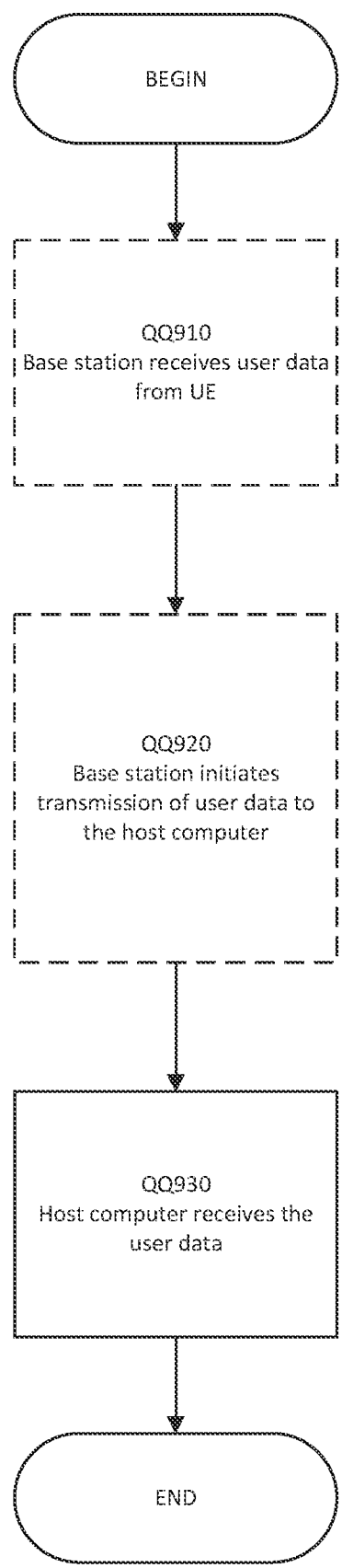
FIG. 18 is a block diagram of methods implemented in a communication system including a host computer, a base station and a user equipment in accordance with some embodiments.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The present application disclosure includes the following description of further embodiments.

INTRODUCTION

Current 5GS QoS framework for Uu interface is capable for supporting V2X services, while it's suggested that NR Sidelink (SL) can inherit similar QoS framework as in Uu interface. This paper further discusses how NR SL Access Stratum (AS) should handle different QoS requirements and realize QoS management.

DISCUSSION

Admission Control in SL

Admission control in Uu interface is based on explicit bearer request and configuration signaling. Similar approach can be used for SL when in NW controlled mode.

In fact, in LTE SL V2X, there is no explicit admission control mechanism on the QoS flow associated to a given V2X service. This implies that even when the channel load is high, any V2X service, even with low priority, can be admitted into the system and be processed at AS layer. As such, the MAC entity needs to find available SL resources to accommodate packets of this service, even when the channel congestion would not allow to reach satisfactory QoS performances. As a consequence, if channel congestion is high and the UE keeps injecting packets in the system, that will further congest the channel, thereby affecting the performances of other UEs as well.

In SL V2X, there is no admission control on the QoS flow associated to a V2X service. The consequence is that packets may be injected into the AS layers, even if the channel congestion and resource availability does not allow to reach the desired QoS performances of the incoming QoS flow.

Therefore, in our understanding, a more concrete admission control on the QoS flow is beneficial in SL. In this way, the UE will have the possibility to perform admission control directly on the QoS flow associated to a given V2X service, which maps to one radio flow. The admission control decision could be made based on the required QoS characteristics described above of an incoming flow, e.g. data rate, PDB, reliability, ARP, etc, and the channel congestion. Admission control should be applicable both for UE-autonomous resource allocation and gNB-scheduled resource allocation.

RAN2 studies NR SL admission control both for UE-autonomous resource allocation and gNB-scheduled resource allocation.

NR SL admission control may take into account both QoS properties (e.g. 5QI, ARP, etc) of an incoming QoS flow and sidelink channel status.

The admission control may be handled differently depending on whether gNB-scheduled resource allocation is performed or UE-autonomous resource allocation.

In the first case, NR SL UE may notify the gNB about the presence of a new incoming QoS, and the gNB may accept/reject the UE request, or even preempt other ongoing QoS flows. On the other hand, for UE autonomous resource allocation, (pre)configuration may provide different congestion thresholds for the different QoS properties, so that the UE can perform admission control on the basis of (pre) configured rules.

In NW controlled mode, explicit admission control signaling can be used to request/configure/reject/preempt a SL QoS flow between NR SL UE and gNB. In autonomous mode, the admission control follow (pre)configuration, e.g. provided via RRC/SIB.

SL Radio Bearers

The above discussion leads to the conclusion that it is beneficial if QoS flows of different V2X services are anchored to equivalent SL radio bearers at AS layer. How to establish/reject/pre-empt a SL radio bearer is subject to admission control rules as previously described, and which are specified at AS layer.

RAN2 introduces the terminology of SL radio bearer at AS layer, where a SL radio bearer anchors at AS layer a QoS flow of a V2X service, with certain QoS properties (e.g. 5QI, ARP) as defined by upper layers.

A SL radio bearer can be established/rejected/pre-empted depending on admission control rules which for example take into account the QoS properties and channel conditions.

Regarding pre-emption, RAN1/RAN2 may also study if any form of interaction between UEs is needed, especially for UE-autonomous resource allocation. In some cases, it might be beneficial if a single packet transmission of low priority is pre-empted by the packet transmission of higher priority of another UE. In LTE SL, high priority transmissions are allowed to use the same resources as on-going low priority transmissions, which may cause severe interference. Therefore, allowing pre-emption of already booked resources might be beneficial.

RAN1/RAN2 study how to enable effective packet preemption in autonomous mode, e.g. via SL pre-emption signalling between different UEs.

Conclusions

In a previous section, FIG. 2 illustrates a flowchart of operations for establishing a bearer and transmission of a packet according to some embodiments; we made the following observations:

In SL V2X, there is no admission control on the QoS flow associated to a V2X service. The consequence is that packets may be injected into the AS layers, even if the channel congestion and resource availability does not allow to reach the desired QoS performances of the incoming QoS flow.

Based on the discussion in section [00181] we propose the following:

In NW controlled mode, explicit admission control signaling can be used to request/configure/reject/preempt a SL QoS flow between NR SL UE and gNB.

NR SL admission control may take into account both QoS properties (e.g. 5QI, ARP, etc) of an incoming QoS flow and sidelink channel status.

In NW controlled mode, explicit admission control signaling can be used to request/configure/reject/preempt a SL QoS flow between NR SL UE and gNB.

In autonomous mode, the admission control follow (pre) configuration, e.g. provided via RRC/SIB.

RAN2 introduces the terminology of SL radio bearer at AS layer, where a SL radio bearer anchors at AS layer a QoS flow of a V2X service, with certain QoS properties (e.g. 5QI, ARP) as defined by upper layers.

A SL radio bearer can be established/rejected/pre-empted depending on admission control rules which for example take into account the QoS properties and channel conditions.

RAN1/RAN2 study how to enable effective packet preemption in autonomous mode, e.g. via SL pre-emption signalling between different UEs.

INTRODUCTION

Current 5GS QoS framework for Uu interface is capable of supporting V2X services, while it's suggested that NR Sidelink (SL) can inherit similar QoS framework as in Uu interface. This paper further discusses how NR SL Access Stratum (AS) should handle different QoS requirements and realize QoS management.

DISCUSSION

Admission Control in SL

Admission control in Uu interface is based on explicit bearer request and configuration signaling. Similar mechanism can be used for SL when in network-controlled mode. That is, before activating any V2X service, NR SL UE requests a corresponding Data Radio Bearer (DRB), if accepted, then gNB will send the bearer configuration back to UE. In case channel becomes congested and there are new bearer requests, gNB shall pre-empt lower priority bearers, e.g. with a higher Allocation Retention Priority (ARP) value, and reserve those resources for higher priority bearer establishment, e.g. with a lower ARP value.

When in autonomous mode, explicit signaling is not always applicable, e.g. when UEs are out of coverage. In this case, establishment of DRB and mapping QoS flow to DRB can be based on pre-configuration while can be overridden by NW signaling, e.g. RRC/SIB. For instance, pre-configuration/RRC/SIB can imply different channel busy ratio (CBR) thresholds for establishing different bearers. Such that bearers with stringent QoS requirements can only be established when CBR is low.

Admission control mechanism used for Uu interface can be adapted for SL.

In network-controlled mode, explicit admission control signaling can be used to request/configure/reject/preempt a SL DRB between NR SL UE and gNB.

In autonomous mode, bearer establishment by individual UE shall follow preconfigured rules and can be overridden by network signaling, e.g. RRC/SIB.

1.1 SL Bearer Configuration

QoS flow from upper layers contains information about the corresponding QoS parameters and is treated accordingly in AS layers, e.g. is mapped to a proper configured DRB. For example:

Duplication is used for QoS flows with high reliability requirement

Carrier aggregation is used for high payload/data rate requirement

In autonomous mode, scheduling window setting, e.g. T1 and T2, shall fulfil the latency requirement When SL unicast is used, the actual QoS performance can be monitored by the UE or gNB based on ACK/NACK. Bearer reconfiguration at the transmitter maybe triggered if the QoS requirement cannot be achieved even after link adaptation. When SL broadcast is used, QoS monitoring and channel measurement is tricky due to unknown target receivers. Thus, broadcast bearer is configured in a best effort fashion especially with the respect to reliability.

SL bearers shall be configured in a way that the QoS requirements can be fulfilled.

a. In network-controlled mode, the bearer is configured by network.

b. In autonomous mode, bearer configuration follows preconfigured rules and can be overridden by network signaling, e.g. RRC/SIB.

c. For NR SL unicast bearer, actual QoS performance is monitored by UE or gNB based on ACK/NACK and bearer reconfiguration may be triggered.

d. NR SL broadcast bearer is configured in a best effort fashion.

1.2 SL Packets Pre-Emption

In NR Uu interface, ARP is used for bearer admission control, while Priority Level (PL) is indicated by 5QI and is used for making scheduling decisions, e.g. the scheduler may schedule packets with higher priority (meaning a lower Priority Level) first. Similarly, after a NR SL bearer is established, PL indicated by 5QI can help to schedule SL packets according to priority differences.

When in network controlled mode, any SL transmission is scheduled by gNB. gNB may schedule higher priority transmissions first. In some cases, gNB may pre-empty lower priority transmissions and dedicate the resources freed for newly arrived packets with higher priority.

Once a SL bearer is established, priority level indicated by 5QI can help to schedule SL packets according to priority differences.

RAN1 studies mechanisms to allow the gNB to monitor the resource utilization of SL UEs and mechanisms to allow the gNB to pre-empt transmissions of SL UEs.

When in autonomous mode, scheduling and pre-emption are done in a distributed way without network signaling. Following the similar principle as aforementioned, higher priority transmissions shall be scheduled first, and low priority transmissions can be pre-empted when resources are not enough. On the other hand, detailed pre-emption rules and mechanisms need to be further studied to enable effective packet pre-emption in autonomous mode. For instance, a pre-emption signaling is needed to allow inter-UE packets pre-emption, e.g. one UE explicitly informs another UE about the pre-emption intention and the corresponding resources. Besides, in LTE SL, high priority transmissions are allowed to use the same resources as on-going low priority transmissions, which may cause severe interference. One way to resolve this issue in NR SL is that one UE is only allowed to pre-empt booked transmissions of other UEs while cannot interfere transmissions which are already scheduled.

RAN1 study mechanisms to enable effective packet pre-emption in autonomous mode.

A pre-emption signalling can be designed to allow inter-UE packets pre-emption.

The pre-emption shall target only booked transmissions instead of scheduled transmissions.

Conclusions

Admission control mechanism used for Uu interface can be adapted for SL.

Based on the discussion in above sections, the present disclosure proposes the following:

In NW controlled mode, explicit admission control signaling can be used to request/configure/reject/preempt a SL QoS flow between NR SL UE and gNB.

In autonomous mode, the admission control follow (pre) configuration, e.g. provided via RRC/SIB.

SL bearers shall be configured in a way that the QoS requirements can be fulfilled.

a In network-controlled mode, the bearer is configured by network.

b In autonomous mode, bearer configuration follows preconfigured rules and can be overridden by network signaling, e.g. RRC/SIB.

c For NR SL unicast bearer, actual QoS performance is monitored by UE or gNB based on ACK/NACK and bearer reconfiguration may be triggered.

d NR SL broadcast bearer is configured in a best effort fashion.

RAN1 studies mechanisms to allow the gNB to monitor the resource utilization of SL UEs and mechanisms to allow the gNB to pre-empt transmissions of SL UEs.

RAN1 study mechanisms to enable effective packet pre-emption in autonomous mode.

A pre-emption signalling can be designed to allow inter-UE packets pre-emption.

The pre-emption shall target only booked transmissions instead of scheduled transmissions.

The invention claimed is:

1. A method of operating a user equipment, UE, for device-to-device, D2D, communications, the method comprising:
receiving booking information from another UE, the booking information identifying a resource that the other UE is booking to use for transmission by the other UE and further including priority information, wherein the priority information comprises bearer level priorities for bearers as content of the booking information;
selectively transmitting preemption signaling based on whether the received priority information indicates lower priority than local priority information that is associated with a transmission to be scheduled by the UE, wherein the preemption signaling indicates preemption of the UE to use the resource identified by the booking information, by:
responsive to an attempt to activate a service and a determination that there are not enough available channel resources to support a defined QoS for the service, comparing a local bearer level priority that is defined for the service to a bearer level priority provided by the priority information received as content of the booking information; and
responsive to when the local bearer level priority defined for the service has a higher priority than the bearer level priority provided by the priority information received from the other UE, transmitting the preemption signaling to the other UE; and
responsive to when the local bearer level priority associated with the service has a same priority as the bearer level priority provided by the priority information received from the other UE, comparing a local packet level priority that is defined for the service to a packet level priority provided by the priority information received from the other UE; and
responsive to when the local packet level priority that is associated with the service has a higher priority than the packet level priority provided by the priority information received from the other UE, transmitting the preemption signaling to the other UE; and
scheduling the UE to transmit using the resource identified by the booking information by scheduling the UE to transmit using a resource that is associated with the bearer level priority provided by the priority information received from the other UE.

2. The method of claim 1, wherein:
the operation to selectively transmit preemption signaling, comprises selectively transmitting the preemption signaling based on comparison of the received bearer level priorities for the bearers to a local bearer level priority.

3. The method of claim 2, further comprising:
for each of the bearers, controlling establishment and release of the bearer by the UE responsive to comparison of the received bearer level priority for the bearer to the local bearer level priority.

4. The method of claim 1, wherein:
the operation to schedule the UE to transmit using the resource identified by the booking information, comprises scheduling a packet for transmission that is selected among a plurality of queued packets based on comparison of the received packet level priority to packet level priorities of the queued packets.

5. The method of claim 1, wherein:
the local priority information comprises a local bearer level priority indicator for a sidelink, SL, bearer and a local packet level priority indicator, wherein the local bearer level priority and the local packet level priority are mapped to a service, and wherein the mapping is received from a network node.

6. The method of claim 5, further comprising:
receiving the mapping in at least one system information block or at least one radio resource control block from the network node.

7. The method of claim 1, wherein:
the received priority information comprises a bearer level priority indicator for a sidelink, SL, bearer and a packet level priority indicator, and the booking information is received in sidelink control information from the other UE.

8. The method of claim 1, wherein:
the local priority information comprises a bearer level priority indicator for a sidelink, SL, bearer and a packet level priority indicator, which are determined based on UE subscription information and/or based on a service level agreement for the UE.

9. The method of claim 1, wherein the operation to selectively transmit preemption signaling based on whether the received priority information indicates lower priority than local priority information that is associated with a transmission to be scheduled by the UE, further comprises:
responsive to when the packet level priority associated with the service has a lower priority than the packet level priority provided by the priority information received from the other UE, ceasing establishing of a bearer for the service and deactivating the service.

10. The method of claim 1, further comprising:
based on having established a radio bearer for use by a service and responsive to obtaining a new packet that is to be scheduled for transmission and when the radio channel is determined to be not congested according to a defined rule, transmitting the new packet and priority information.

11. The method of claim 1, further comprising:
based on having established the radio bearer for use by the service and responsive to having obtained the new packet that is to be scheduled for transmission and when the radio channel is determined to have become congested according to the defined rule, performing:
    comparing a bearer level priority that is defined for the service to each of a plurality of bearer level priorities that were received as content of booking information from one or more other UEs;
    for each the comparisons, responsive to when the bearer level priority defined for the service has a higher priority than the one of the bearer level priorities that was received, marking an associated resource as a candidate for preemption; and
    when a set of resources that have been marked as candidates for preemption will provide sufficient resources to satisfy a Quality of Service defined for the service, transmitting preemption signaling indicating which of the resources in the set that have been booked by one or more of the other UEs are being preempted for use by the UE.

12. The method of claim 11, wherein for each the comparisons,
responsive to when the bearer level priority defined for the service has a same priority as the bearer level priority that was received, comparing a packet level priority that is defined for the service to a packet level priority that was received, and
responsive to when the packet level priority that is defined for the service has a higher priority than the packet level priority that was received, marking an associated resource as a candidate for preemption.

13. The method of claim 12, wherein when the set of resources that have been marked as candidates for preemption would not provide sufficient resources to satisfy the Quality of Service defined for the service, releasing a bearer for the service and deactivating the service.

14. The method of claim 1, further comprising:
transmitting booking information identifying a resource that the UE is booking to use for transmission and including priority information in the transmitted booking information;
receiving preemption signaling from another UE indicating that the UE's booking of the identified resource is being preempted for use by the other UE; and
responsive to receipt of the preemption signaling, performing operations to reschedule packet transmissions by the UE.

15. The method of claim 1, further comprising:
performing an admission control policy that comprises:
    following establishment of a sidelink, SL, bearer for a service, releasing the SL bearer when any one of the following conditions occurs:
    a) an inter-arrival time duration between receipt by the UE of packets belonging to the SL bearer is larger than a defined time threshold;
    b) a time life of the SL bearer since a time when it was established is larger than a defined threshold; and
    c) channel conditions are determined to not be satisfactory for an quality of service associated with the SL bearer.

16. A user equipment, UE, comprising:
a transceiver;
a processor coupled to the transceiver; and
a memory coupled with the processor, wherein the memory stores instructions that when executed by the processor causes the UE to perform operations comprising:
    receiving booking information from another UE, the booking information identifying a resource that the other UE is booking to use for transmission by the other UE and further including priority information, wherein the priority information comprises bearer level priorities for bearers as content of the booking information;
    selectively transmitting preemption signaling based on whether the received priority information indicates lower priority than local priority information that is associated with a transmission to be scheduled by the UE, wherein the preemption signaling indicates preemption of the UE to use the resource identified by the booking information, by:
        responsive to an attempt to activate a service and a determination that there are not enough available channel resources to support a defined QoS for the service, comparing a local bearer level priority that is defined for the service to a bearer level priority provided by the priority information received as content of the booking information; and
        responsive to when the local bearer level priority defined for the service has a higher priority than the bearer level priority provided by the priority information received from the other UE, transmitting the preemption signaling to the other UE; and
        responsive to when the local bearer level priority associated with the service has a same priority as the bearer level priority provided by the priority information received from the other UE, comparing a local packet level priority that is defined for the service to a packet level priority provided by the priority information received from the other UE; and
    responsive to when the local packet level priority that is associated with the service has a higher priority than the packet level priority provided by the priority information received from the other UE, transmitting the preemption signaling to the other UE; and scheduling the UE to transmit using the resource identified by the booking information by scheduling the UE to transmit using a resource that is associated with the bearer level priority provided by the priority information received from the other UE.

17. A computer program product, comprising:
a non-transitory computer readable storage medium comprising computer readable program code embodied in the medium that when executed by a processor of a user equipment, UE, causes the UE to perform operations according to claim 1.

\* \* \* \* \*